United States Patent
Davis et al.

(10) Patent No.: US 7,227,933 B1
(45) Date of Patent: *Jun. 5, 2007

(54) SYSTEM AND METHOD FOR REMOTE MANAGEMENT OF A DSL DEVICE

(75) Inventors: Jeffrey P. Davis, Ham Lake, MN (US); Raghu Sharma, North Oaks, MN (US)

(73) Assignee: Multi-Tech Systems, Inc., Mounds View, MN (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/463,257

(22) Filed: Jun. 17, 2003

Related U.S. Application Data

(63) Continuation of application No. 09/840,846, filed on Apr. 24, 2001, now Pat. No. 6,700,955, which is a continuation-in-part of application No. 09/481,429, filed on Jan. 12, 2000, now Pat. No. 6,442,248.

(51) Int. Cl.
*H04M 11/00* (2006.01)
(52) U.S. Cl. .............................. 379/93.01; 379/93.07; 379/93.28
(58) Field of Classification Search ........... 379/102.01, 379/102.02, 102.03, 102.07, 106.01, 93.28, 379/93.29, 93.31, 93.01, 90.01, 93.17; 375/222
See application file for complete search history.

(56) References Cited

U.S. PATENT DOCUMENTS

| | | | |
|---|---|---|---|
| 5,305,312 A | 4/1994 | Fornek et al. | 370/62 |
| 5,506,892 A * | 4/1996 | Kojima et al. | 379/102.03 |
| 5,526,408 A | 6/1996 | Yekutiely | 379/90 |
| 5,719,922 A | 2/1998 | Bremer et al. | 379/88 |
| 5,774,383 A | 6/1998 | Hankes | 364/708.1 |
| 5,815,505 A | 9/1998 | Mills | 370/522 |
| 5,854,828 A * | 12/1998 | Kocis et al. | 379/93.31 |
| 5,889,845 A | 3/1999 | Staples et al. | 379/211 |
| 5,889,856 A | 3/1999 | O'Toole et al. | 379/399 |
| 5,915,026 A * | 6/1999 | Mankovitz | 379/102.03 |
| 5,940,485 A | 8/1999 | Sapra et al. | 379/142 |
| 5,946,386 A | 8/1999 | Rogers et al. | 379/265 |

(Continued)

FOREIGN PATENT DOCUMENTS

JP 402206958 A 8/1990

(Continued)

OTHER PUBLICATIONS

"Analog Devices' ADSL (Asymetric Digital Subscriber Line) Technology", http://www.analog.com/publications/whitepapers/products/back_adsl/index.html (as printed on Nov. 22, 1999); datasheet published by Analog Devices Inc.,(1995),pp. 1-6.

(Continued)

*Primary Examiner*—Stella Woo
(74) *Attorney, Agent, or Firm*—Schwegman, Lundberg, Woessner & Kluth, P.A.

(57) ABSTRACT

Remote access and configuration of a digital subscriber line (DSL) device using a telephone line. From a remote location, an operator can access the DSL device and receive data, including an operational parameter regarding the device, and upload an operational parameter or firmware, and thus, establish the operational configuration of the device. Also from a remote location, an operator can troubleshoot and provide technical support functions for the device.

5 Claims, 17 Drawing Sheets

U.S. PATENT DOCUMENTS

| | | | |
|---|---|---|---|
| 5,999,207 A | 12/1999 | Rodriguez et al. | 348/14 |
| 6,005,923 A | 12/1999 | Lee | 379/93.09 |
| 6,009,153 A * | 12/1999 | Houghton et al. | 379/102.02 |
| 6,061,392 A | 5/2000 | Bremer et al. | 375/222 |
| 6,067,316 A | 5/2000 | Amrany et al. | 375/220 |
| 6,118,768 A | 9/2000 | Bhatia et al. | 370/254 |
| 6,121,998 A | 9/2000 | Voois et al. | 348/14 |
| 6,198,946 B1 | 3/2001 | Shin et al. | 455/561 |
| 6,424,675 B1 * | 7/2002 | Macdonald et al. | 375/222 |
| 6,483,906 B1 * | 11/2002 | Iggulden et al. | 379/102.03 |
| 6,504,926 B1 | 1/2003 | Edelson et al. | 379/390.01 |
| 6,539,499 B1 * | 3/2003 | Stedman et al. | 714/40 |
| 6,700,955 B1 * | 3/2004 | Davis et al. | 379/90.01 |
| 2002/0004935 A1 * | 1/2002 | Huotari et al. | 717/11 |
| 2003/0190016 A1 * | 10/2003 | MacDonald et al. | 379/22.04 |

FOREIGN PATENT DOCUMENTS

| | | |
|---|---|---|
| JP | 407288595 A | 10/1995 |
| JP | 408331359 A | 12/1996 |
| JP | 409023324 A | 1/1997 |
| JP | 410126551 A | 5/1998 |
| WO | WO 99/18712 | 4/1999 |
| WO | WO 99/29097 | 6/1999 |

OTHER PUBLICATIONS

"DSL and xDSL (Digital Subscriber Line and its Variations)", http://whatis.com/dsl.htm (as printed on Jan. 3, 2000), published by whatis.com, Inc.,(Dec. 21, 1999),pp. 1-8.

"How Does ADSL Work", http://www.orckit.com/how_does_ads_works2.html (as printed on Nov. 22, 1999); published by Orckit Communications, Ltd., (1998),pp. 1-4.

"How Does ADSL Work", http://www.orckit.com/how_does_ads_works3.html (as printed on Nov. 22, 1999); published by Orckit Communications,(1998),pp. 1-4.

"How Does ADSL Work", http://www.orckit.com/how_does_ads_works.html (as printed on Nov. 22, 1999); published by Orckit Communications Ltd.,(1998),pp. 1-3.

"xDSL Overview", http://www.netspeed.com/overview.html (as printed on Nov. 22, 1999); published by NetSpeed, Inc.,(1999),pp. 1-5.

Aber, R. , "xDSL Local Loop Access Technology", http://www.3com/technology/tech_net/white_papers/500624.html as printed on Sep. 24, 1999, published by 3Com Corporation.,(1999),pp. 1-11.

Schweber, B. , "Analog Front Ends Bridge the xDSL-to-Real-World-Chasm", http://www.ednmag.com/ednmag/reg/1999/040199/07cs.htm (as printed on Dec. 30, 1999); published by EDN Magazine,(1999),pp. 1-9.

* cited by examiner

SYSTEM AND METHOD FOR REMOTE MANAGEMENT OF A DSL DEVICE

CROSS-REFERENCE TO RELATED APPLICATION(S)

This application is a continuation of U.S. patent application Ser. No. 09/840,846, filed on Apr. 24, 2001 now U.S. Pat. No. 6,700,955, which is a continuation-in-part of U.S. application Ser. No. 09/481,429, filed Jan. 12, 2000 now U.S. Pat. No. 6,442,248, the specifications of which are incorporated herein by reference.

FIELD OF THE INVENTION

The present subject matter relates generally to telecommunications and more particularly to a system and method of providing a plurality of analog and digital telephone functions simultaneously and independently on the same telephone line.

In addition, the present subject matter relates generally to configuring a remote device, and particularly, to configuring a digital subscriber line (DSL) device via an analog modem through a public switched telephone network (PSTN).

BACKGROUND

The rising popularity of telephones and telecommunications has imposed a tremendous demand on traditional telephone services. Facsimile machines, cellular telephones and browsing the Internet has fueled the demand for telephone numbers. The burgeoning demand for telephone access has been frustrated by the present telephone system.

A significant problem facing users of telecommunications technology is the inability to access familiar telephone functions while conducting a digital communication session. For example, while accessing the Internet, a computer-based answering machine connected to that same telephone line is unavailable for recording incoming messages. Thus, a need exists for a method and system of saving incoming messages, simultaneously and independently, of a digital communication session.

Another problem is the inability to automatically identify and route incoming calls based on caller identification information while using a computer for modem communications. Also, users are unable to route incoming calls based on signal content while using a computer for modem communications. Thus, a need exists for a method and system of identifying and routing incoming telephone calls, simultaneously and independently, of a digital communication session.

A further drawback is the inability to conduct a speakerphone conversation using a computer while the computer is engaged in a modem communication session. Thus, a need exists for a method and system of conducting speakerphone telephone calls, simultaneously and independently, of a digital communication session.

Yet another drawback is the inability to transmit and receive facsimile ("fax") communications using a computer while the computer is engaged in a modem communication session. Thus, a need exists for a method and system of transceiving fax communications, simultaneously and independently, of a digital communication session.

In addition, the rising demand for high speed network communication has led to the development of such communication technologies as ISDN (integrated services digital network), T1, E1, cable modem, wireless networking, and DSL modem communications.

Traditionally, configuring network hardware to enable broad band communication has required that the user execute complex and detailed installation and configuration instructions. In many cases, the installation and configuration services have been provided by trained specialists. Installation and configuration typically entails setting up the equipment, connecting appropriate cables and connectors, installing software drivers and selecting various operating parameters. In some cases, the trained field technical support personnel travel to the customer site and arrange for the installation and configuration of the customer's network equipment.

What is needed is a method and system to allow remote configuration of a communication device, such as a DSL modem.

SUMMARY OF THE INVENTION

One skilled in the art will readily recognize that the embodiments described solve all of these problems and many more not mentioned expressly herein.

In one embodiment, the apparatus comprises a telephone line interface for connection to a telephone line, an analog section, a digital section and a computer interface. The analog section comprises a first signal processor coupled to the telephone line interface and a message storage. The first message storage is adapted for processing digitized signals having frequencies in the audio spectrum. The digital section includes a second processor, also coupled to the telephone line interface. The second processor includes a modem adapted for communicating at frequencies substantially above the audio spectrum. The computer interface is connected to the analog section and the digital section and enables coupling of the apparatus to a computer.

In one variation, the modem is a digital subscriber line modem. Other variations provide that the computer interface includes an Ethernet port, a Universal Serial Bus port, or a wireless network connection. One variation provides that the analog section comprises a caller identification information decoder, a packet header decoder, a facsimile tone decoder, a dual-tone multi-frequency decoder, or a distinctive ring decoder. One variation includes an FXS/FXO (foreign exchange station and foreign exchange office) interface, a DID (direct inward dial) interface, or an E&M (ear and mouth) interface, and a connector coupled to the analog section.

One embodiment comprises a method, and includes establishing a modem communication session with a remote modem wherein the modem communication session is conducted within a first frequency band and using a local computer, a local modem, and a telephone line. The method also includes establishing an analog telephone call on the telephone line wherein the analog telephone call includes audio from a remote caller in a second frequency band and the second frequency band includes frequencies different from those of the first frequency band. The method also includes transmitting prerecorded analog audio on the telephone line, receiving audio signals from the remote caller, digitizing the audio signals from the remote caller, and storing the digitized audio.

Variations include detecting and answering an incoming analog telephone call. In one variation, caller identification information with the incoming analog telephone call is decoded. In one variation, the modem communication session is concurrent with the analog telephone call. One variation includes establishing a digital subscriber line communication session. One variation includes transferring stored digitized audio to a remote location using the telephone line or the local computer. One variation includes signaling detection of the incoming analog telephone call.

In one embodiment, a communication method is taught. The method includes establishing a modem communication session with a remote modem, detecting an incoming telephone call on the telephone line, detecting the content of the incoming telephone call, and if the content indicates an authorized caller, then processing the incoming telephone call, otherwise, rejecting the call. The modem communication session is conducted within a first frequency band and using a local computer, a local modem, and a telephone line. The incoming telephone call is concurrent with the modem communication session and is received from a remote caller and including signals in a second frequency band. The second frequency band includes frequencies different from those of the first frequency band and the incoming telephone call includes analog signals.

Variations include establishing a digital subscriber line communication session and signaling the detection of the incoming telephone call on a computer monitor. One variation includes signaling the detection of the incoming telephone call on a computer monitor connected to the local computer. One variation includes reproducing the audio portion of the incoming call using a speaker connected to the local computer as well as using a microphone connected to the local computer. One variation includes answering the incoming telephone call and storing digital content. Other variations include answering the incoming telephone call, digitizing the analog portion of the incoming telephone call and storing the digitized analog portion. One embodiment includes routing the incoming telephone call to a computer coupled to the local computer. One embodiment includes routing the incoming telephone call to a second computer coupled to the local computer, where the second computer is selected as a function of the content. One variation includes detecting an incoming modem communication session where the incoming modem communication session includes digital audio, digital data, digital video or voice over data. One variation includes detecting caller identification information, detecting packet header information, detecting facsimile tones, detecting dual-tone multi-frequency signals or detecting a distinctive ring.

In one embodiment, a method of conducting communication is taught, comprising establishing a communication session with a remote location using the telephone line, detecting an incoming telephone call on the telephone line, detecting the content of the incoming telephone call, comparing the content of the incoming telephone call with authorization information, and when the content indicates an authorized call answering the incoming telephone call and when the content indicates an unauthorized call, rejecting the call. In this method, the incoming telephone call is from a remote caller and has content including analog signals or digital data.

Variations include detecting caller identification information, detecting packet header information, detecting facsimile tones, or detecting dual-tone multi-frequency signals. Other variations include determining if the content of the incoming telephone call comprises facsimile data, analog audio, digital audio, digital data, or voice over data. One variation includes establishing a digital subscriber line modem communication session. One variation includes storing the content of the incoming telephone call.

Furthermore, one embodiment includes a communication apparatus having a first telephone line interface to couple to a public access telephone system, an analog-to-digital converter coupled to the first telephone line interface, an analog module coupled to the analog-to-digital converter, where the analog module includes a first signal processor, a first memory coupled to the first signal processor, an audio speaker coupled to the first signal processor; a microphone coupled to the first signal processor, and a second memory coupled to the first signal processor. The apparatus further includes a digital module coupled to the second memory and coupled to an the first telephone line interface through an analog front end. The digital module includes a second signal processor comprising a broadband modem, and a third memory coupled to the second signal processor. The apparatus further includes a computer interface coupled to the first signal processor and coupled to the second signal processor and a user module coupled to the analog module, wherein the user module comprising a keypad and a display.

In one variation, the first signal processor is adapted to detect the content of signals appearing on the first telephone interface. In one variation the second signal processor comprises a digital subscriber line modem. Other variations include a cable modem and further provide that the analog front end comprises a tuner. One variation provides both a cable modem and a digital subscriber line modem and further provides that the analog front end comprises a tuner. One variation includes an FXS/FXO interface, a DID interface, or an E&M interface, and a telephone line connector coupled to the analog module.

In one embodiment of the present subject matter, a system and method is provided to allow a DSL device, such as a router or modem, to be configured from a remote location using the public switched telephone network (PSTN). The DSL device is coupled to a telephone line having a particular telephone number. A remote caller can access the DSL device using the particular telephone number and an analog modem communication link and thus, access and select operating parameters and configure the device.

This summary is intended to provide a brief overview of some of the embodiments of the present system, and is not intended in an exhaustive or exclusive sense and the scope of the inventions is to be determined by the attached claims and their equivalents.

DETAILED DESCRIPTION

One embodiment of the present invention, as described below, is a small office telecommunication system that provides traditional voice telephone service along with high speed Internet access, voice message saver functions, caller identification information, fax service, digital data communication and voice-over-data communication. The system enables a single copper telephone line to provide multiple communication services. In a typical application, the system is connected to a host computer and a telephone line, commonly referred to as POTS, "plain old telephone system." When the computer is shut off, the system provides one set of telecommunication functions and when the computer is turned on, additional telecommunication functions are available. For example, caller identification information appears on the system display when the computer is shut off, and when the computer is turned on, the caller identification information appears as a pop-up display on the monitor of the computer. When connected to a local network of computers, the caller identification information appears on selected computers within the local network.

Figure 1:
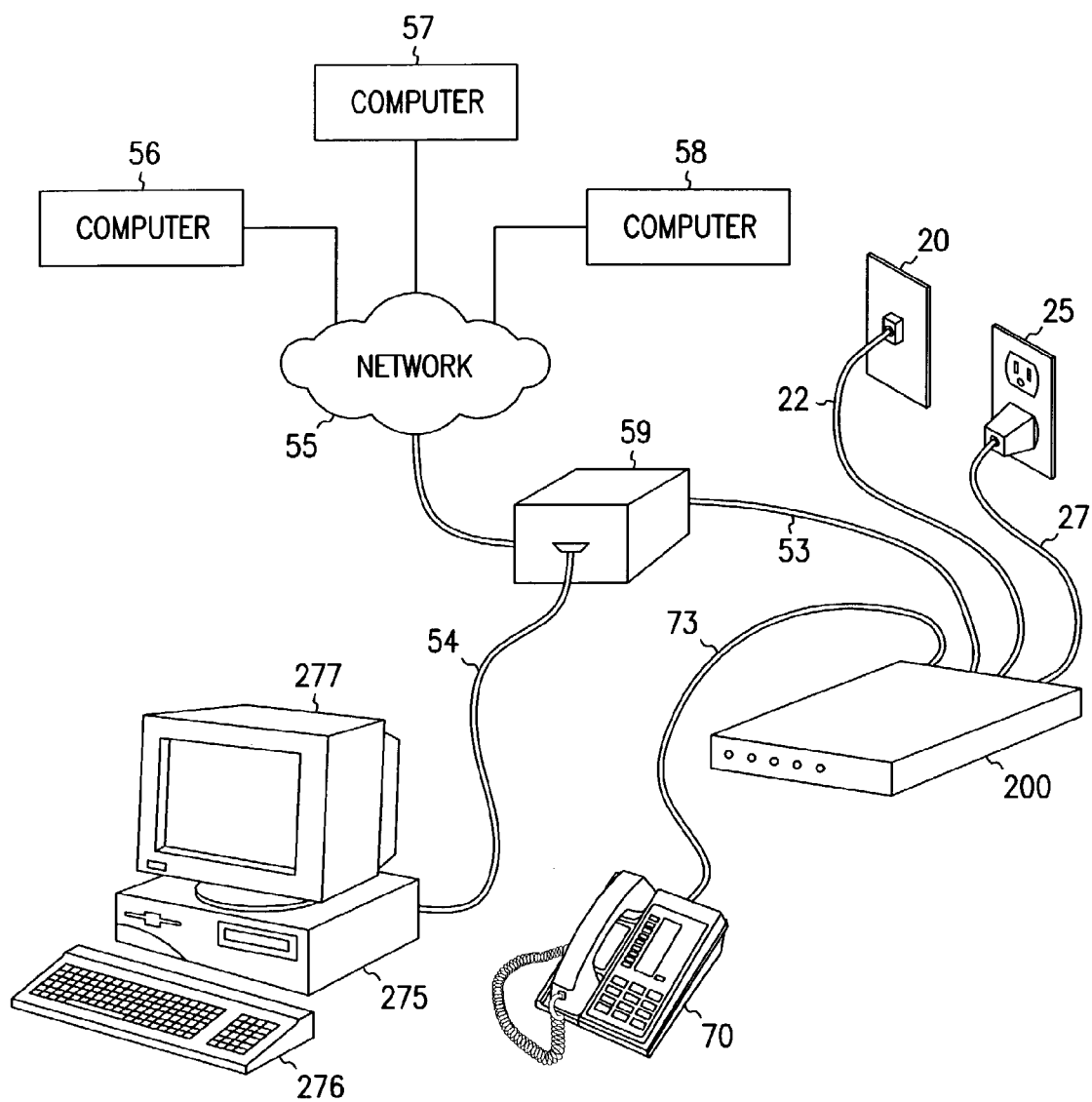
FIG. 1 depicts one embodiment of the present subject matter coupled to a host computer and telephone line.

FIG. 1 depicts one embodiment of the present subject matter in a typical application. In FIG. 1, the present subject matter, referred to herein as "system 200," is coupled to both a host, or local, computer 275 and telephone 70. System 200 is also shown coupled to hub 59 and network 55 having three computers, computer 56, computer 57 and computer 58. It is understood that network 55 may have any number of computers and FIG. 1 depicts one representative embodiment having three. System 200 is also coupled to telephone wall connector 20 by telephone cord 22. Telephone wall connector 20 may include an RJ-11 connector. System 200 is also coupled to wall power outlet 25 through power cord 27. Computer 275 is also coupled to monitor 277 and keyboard 276 by cables not visible in FIG. 1. System 200 is coupled to telephone 70 through cord 73.

In one embodiment, system 200 operates using a digital subscriber line ("DSL"). Various types of DSL technologies are currently available and are referred to collectively as xDSL, where the letter x is A (for asymmetric), RA (for rate adaptive), H (for high bit rate) or any of a number of other variations. International Telecommunications Union ("ITU") specification G.992.1 describes ADSL and G.992.2 describes G.Lite DSL, each of which is hereby incorporated by reference. In general, DSL services are used for point-to-point communications for accessing a public network. DSL permits multiple forms of data, voice, and video to be carried over twisted-pair copper wires on the local loop. The local loop may be the last mile segment between a network service provider's central office and the customer site, or a geographically-created local loop.

In one embodiment, system 200 operates using broadband communication technology which allows communication using multiple forms of data, voice and video. System 200 is operable using communication technology that allows digital data to be transferred through the communication channel without the need for converting between digital data and analog signals. Communications conducted exclusively in the digital domain can proceed without the time delays caused by digital-to-analog converters and analog-to-digital converters. Examples of broadband communication technology operable with the present subject matter include cable modem communications and high data rate ("HDR") wireless communications.

System 200, in the embodiment depicted in FIG. 1, allows for originating and receiving multiple telephone calls having various content including either analog signals, digital data, or both. Analog signals may include audio signals or analog fax transmissions. Analog signals may also include modem communications, including those modem communications conforming to standards such as V.32, V.32bis, V.34, V.90 as promulgated by ITU, or any other such communication standard. The communication standards V.32, V.32bis, V.34, V.90 are herein incorporated by reference. Digital data may include binary data or other digitized data, such as digital voice or digital audio. Digital data may also include digital files. Digital data may include voice-over-Internet-Protocol ("VOIP") conforming to a standard such as H.323 promulgated by ITU and herein incorporated by reference, or any of a variety of other proprietary standards. Digital data may also include digital simultaneous voice and data ("DSVD"), such as V70 DSVD or other proprietary standard. Digital data may include data transmitted using DSL technology. Digital data may also include other forms of digital video data and digital fax data.

Figure 2:
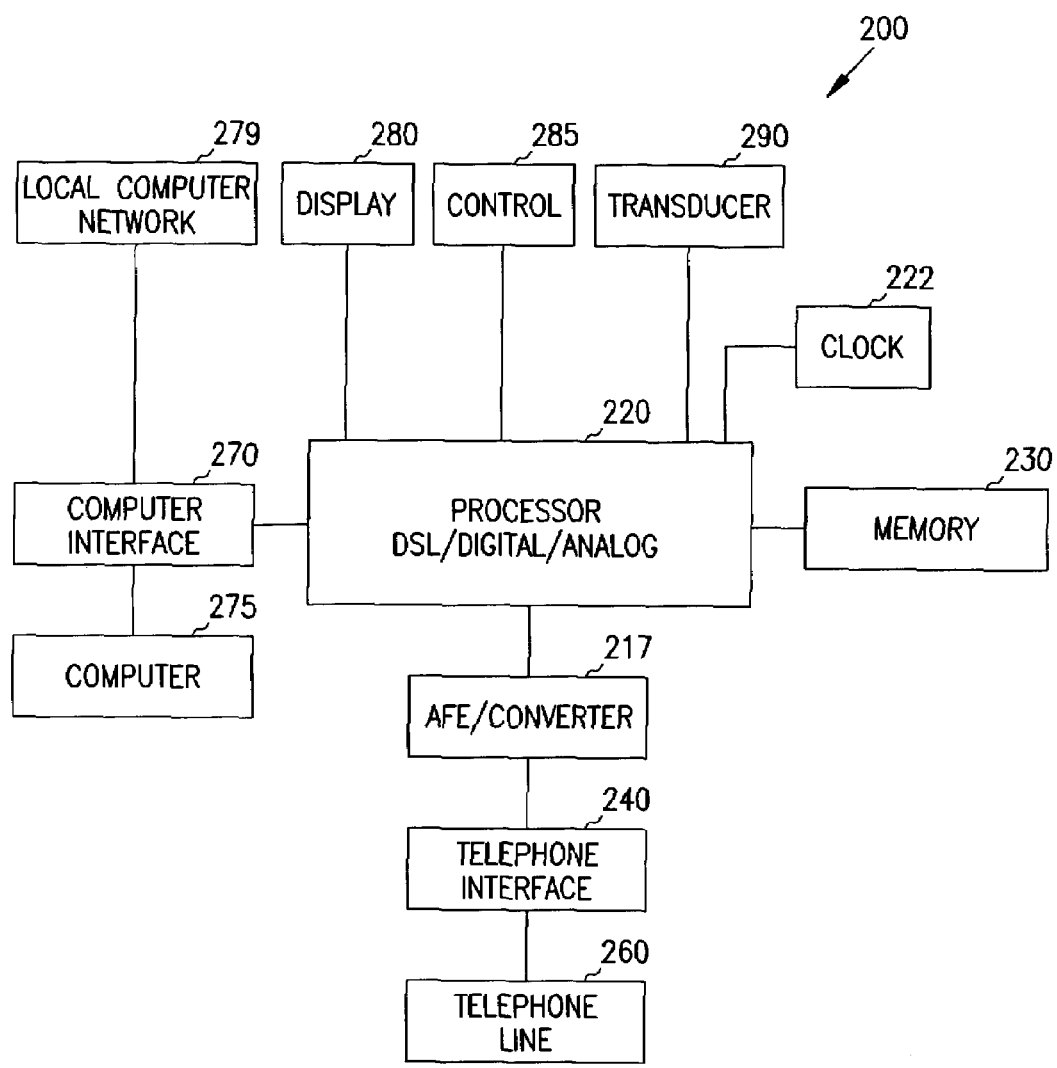
FIG. 2 is a block diagram depicting one embodiment of the claimed subject matter.

FIG. 2 is a block diagram of one embodiment of present system 200. Telephone line 260 is coupled to processor 220 through telephone interface 240 and module 217. In one embodiment, module 217 includes an analog front end ("AFE") and a converter. The AFE portion provides a transition between the local loop and processor 220. In one embodiment, the AFE provides frequency shaping. The converter portion converts incoming analog signals to digital data for processing by processor 220 and converts digital data from the processor into analog signals for delivery to telephone line 260. In one embodiment, telephone interface 240 includes an RJ-11 connector or other connector for coupling to the POTS. Computer 275 is also coupled to processor 220 through computer interface 270. Computer interface 270, in one embodiment, includes a Universal Serial Bus ("USB") connector and USB controller. In one embodiment, computer interface 270 includes an Ethernet connector and an Ethernet controller. In one embodiment, computer interface 270 includes a wireless local area network connection, an example of which is the standard promulgated by the Institute of Electrical and Electronics Engineers, Inc., (IEEE) known as specification 802.11. In one embodiment, computer interface 270 complies with Bluetooth radio communication technology standards. Bluetooth standard 1.0 is herein incorporated by reference. In one embodiment, computer interface 270 includes both a USB connector and USB controller and an Ethernet connector and an Ethernet controller. Other connectors and controllers are also contemplated. Computer 275 is computer, such as an IBM-compatible personal computer, or a Macintosh personal computer. In one embodiment, computer 275 includes suitable application programming to enable communications with, and control of the operation of system 200.

Memory 230 is also coupled to processor 220. Memory 230 provides storage for programming executed by processor 220, storage for messages communicated through telephone interface 240 (both incoming and outgoing), data corresponding to telephone calls (for example, caller identification information), or data relating to processing.

In one embodiment, analog signals received by system 200 are digitized and processed by digital signal processor 220. In addition, digital data received by system 200 is processed by digital signal processor 220. In one embodiment, processor 220 performs DSL communications and system 200 is coupled to telephone line 260 which is a DSL compatible telephone line. Processor 220 also detects and responds to incoming dual-tone multi-frequency ("DTMF") signals. DTMF signals received through telephone interface 240 and detected by processor 220 can be used to control the operation of system 200.

In one embodiment, computer interface 270 enables coupling to local computer network 279. When system 200 is connected to network 279, at least one computer in the network enjoys access to telephone line 260 for telecommunications. In addition, information such as incoming calls and caller identification information can be routed to selected computers comprising network 279. Networks, connectors, and controllers other than Ethernet are also contemplated in the present subject matter.

In one embodiment, system 200 also includes transducer 290. In one embodiment, transducer 290 includes an audio speaker. In one embodiment, transducer 290 includes an audio speaker with a microphone. Transducer 290 includes suitable preamplifiers, drivers and converters to convert stored data into audible sounds using the speaker and local audio into digital signals for processing by processor 220. In one embodiment, transducer 290 includes a unitary handset device or headset device including both a microphone and an audio speaker.

In one embodiment, system 200 also includes display 280 coupled to processor 220. Display 280 may be an LED or LCD display and depict numeric or alphanumeric characters. Display 280 provides a visual indication as to the status, mode of operation or programming of system 200 or indicate the presence of, or quantity of, received messages. In one embodiment, display 280 indicates the time of receipt of received messages. In one embodiment, display 280 indicates decoded caller identification information.

In one embodiment, system 200 also includes control 285, also coupled to processor 220. In one embodiment, control 285 is a user-accessible keyboard including a numeric telephone keypad. Control 285 enables the user to control the data displayed on display 280 or enables the user to manually select a remote location for routing an incoming telephone call. Control 285 also enables the user to enter selected telephone numbers into system 200 for purposes of dialing numbers. Control 285 also enables entry of telephone numbers for which incoming calls are to be rejected or accepted. Other uses for control 285 will be apparent to one of ordinary skill in the art.

Clock 222 is coupled to processor 220 and provides a clock signal for system 200. In one embodiment, system 200 reads an internal clock signal from computer 275 or network 279 and updates clock 222. Clock 222 provides time and date information.

In operation, one embodiment of system 200, as shown in FIG. 2, operates as follows.

System 200 operates as a modem for communicating via telephone line 260 with modem functions performed by processor 220, memory 230 and computer 275. As a modem, system 200 enables data transfer between a remote telecommunication device or network via telephone line 260. In one embodiment, the modem function enables communication with a public access network using DSL technology. Multiple voice and data channels are operable using DSL in conjunction with the present subject matter.

System 200 is operable as a message saver for incoming analog or digital telephone calls. Received messages may include, but is not limited to, analog audio signals (such as voice telephone calls), digital audio, digital data, voice-over-data (such as voice over IP), video with audio or any other combination of digital data and analog signals. In one embodiment, signals bearing analog content arriving at system 200 are digitized, and optionally, compressed by processor 220. Digital data arriving at system 200 via telephone interface 240 is passed directly to processor 220 for further processing.

In one embodiment, incoming telephone calls are detected and answered by processor 220. Processor 220 also determines the content of incoming calls. The content of incoming calls can be detected using various user-selected methods, wherein each method is applied individually or in combination according to a predetermined hierarchy. System 200 can be configured to implement any of the following methods of detecting content. Caller identification information encoded between ringing signals can be used to determine content. Many telephone companies provide caller identification information between the first and second ringing signal and processor 220 can decode this information to determine the content of the call. Fax transmissions provide another means for detecting call content. Fax transmissions include a specific signal, comprised of particular frequencies and cadences in conformance with standard protocols, to signal the recipient that a fax message follows. Packetized digital data may also include header information that indicates the packet content. Caller-generated DTMF signals, in response to prompts generated by system 200, provide another method of content detection. For example, system 200 can prompt a caller to enter a "1" if sending a voice message or "2" if sending a fax. Distinctive ringing also can be the basis for detecting content. For example, a single ring can denote a voice message or a double ring denotes a fax message.

Each of the aforementioned methods of detecting content can be used individually or in combination with other methods. In one embodiment, a user-selected hierarchy of methods may be utilized to detect the call content.

If processor 220 determines that the incoming call includes analog audio, then one embodiment provides that an outgoing greeting message is transmitted on telephone line 260, followed by receiving and storing of the incoming analog audio message. If processor 220 determines that the content of an incoming call does not include analog audio, then one embodiment provides that the content of the incoming call is stored without issuing a greeting message. The incoming content may be stored in memory 230 or in other memory accessible to computer 275. System 200 can subsequently process, store, or transfer the contents of memory 230 to other equipment, including, another storage device, a remote telecommunication device or network. In one embodiment, system 200 can receive into memory 230 data arriving via computer interface 270.

Content detection allows system 200 to determine and provide an appropriate response. For example, one embodiment provides that, upon detecting the incoming call, and without having answered the incoming call, processor 220 decodes the caller identification information and displays the decoded information on display 280 or a monitor coupled to computer 275.

In one embodiment, system 200 uses the content information to select one of a plurality of outgoing greeting messages for rendering prior to receiving an incoming audio message. For example, in one embodiment, system 200 uses the decoded caller identification information to accept or reject an incoming call. Processing of incoming telephone calls as a function of caller identification information is disclosed in U.S. Pat. No. 5,452,289, issued Sep. 19, 1995, entitled COMPUTER-BASED MULTIFUNCTION PERSONAL COMMUNICATION SYSTEM, U.S. Pat. No. 5,546,448, issued Aug. 13, 1996, entitled APPARATUS AND METHOD FOR A CALLER ID MODEM INTERFACE, and U.S. Pat. No. 6,009,082, issued Dec. 28, 1999, entitled COMPUTER-BASED MULTIFUNCTION PERSONAL COMMUNICATION SYSTEM WITH CALLER ID, each of which is assigned to the assignee of the instant application, and each of which is hereby incorporated by reference in its entirety. As another example, in one embodiment, system 200 uses the decoded caller identification information to route the incoming call to a computer or computers in the network coupled to computer interface 270. In one embodiment, system 200 uses the decoded content information to route the received incoming content to a predetermined storage location.

Upon detecting the incoming call content, one embodiment of system 200 provides that a notification message is generated. The notification message may be a displayed message, appearing on display 280 and determined as a function of the content detected. In one embodiment, the notification message appears on a monitor connected to a computer coupled to computer 275 or network 279.

In one embodiment, system 200 can perform speakerphone functions. The processing required to execute handsfree speakerphone operation is provided by processor 220. Transducer 290, or alternatively a speaker and microphone coupled to computer 275 provide the local speaker and microphone to enable handsfree communication. In one embodiment, transducer 290 includes an audio speaker and thus enables system 200 to play stored audio messages.

In one embodiment, system 200 can perform simultaneous and independent telephone functions. For example, while conducting a modem communication session, system 200 can receive and save the content of an incoming audio telephone call. As another example, system 200 can conduct a modem communication session and simultaneously and independently receive an incoming call. The content of the incoming call can be determined by decoding caller identification information, detecting fax tones, detecting user-prompted DTMF signals, or by distinctive ringing, as previously described.

Figure 3:
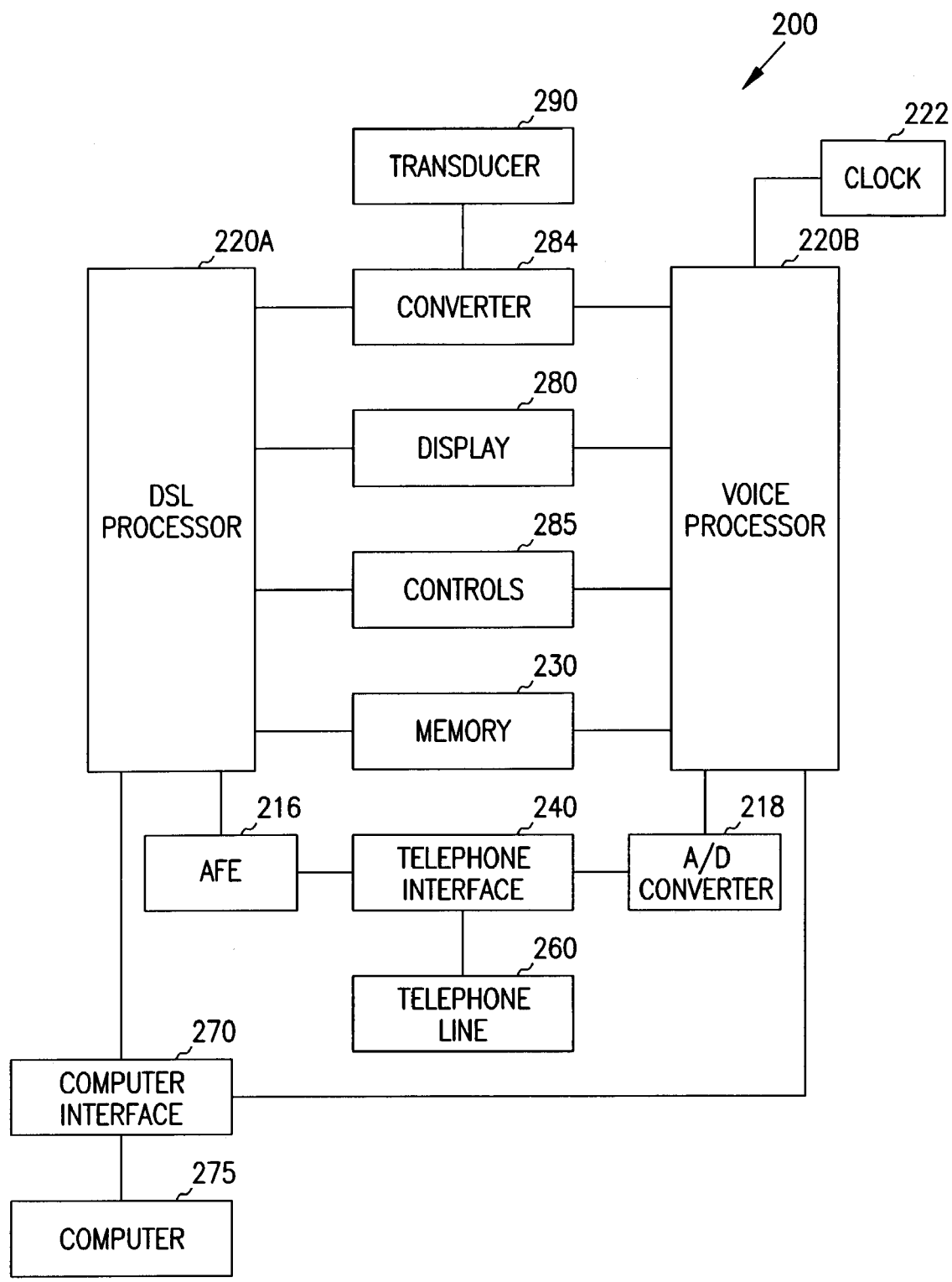
FIG. 3 is a block diagram of one embodiment of the claimed subject matter.

FIG. 3 depicts a block diagram of one embodiment of present system 200. DSL processor 220A and voice processor 220B process the digital and analog incoming calls, respectively. In addition, DSL processor 220A conducts modem communications, such as DSL communications, and voice processor 220B provides the processing services for analog telephone functions, including, for example, speakerphone functions, fax functions, voice messaging or caller identification functions. Voice processor 220B also provides traditional modem communication services and detects DTMF signals as previously described.

Clock 222 is coupled to voice processor 220B and provides a clock signal for system 200. In one embodiment, system 200 reads an internal clock signal from computer 275 or network 279 and updates clock 222. Clock 222 provides time and date information.

In the embodiment depicted in FIG. 3, both DSL processor 220A and voice processor 220B are connected to converter 288. Converter 288, in one embodiment, includes an analog-to-digital converter and a digital-to-analog converter. Converter 288 is coupled to transducer 290. Converter 288 provides electrical signals to create audible signals and digitize received analog audio signals.

In this embodiment, display 280, control 285, and memory 230 are coupled to DSL processor 220A and voice processor 220B. Memory 230 includes, in one embodiment, random access memory, read-only memory, or other types of memory.

Telephone interface 240 is coupled to DSL processor 220A through AFE 216. AFE 216 provides an interface between the local loop coupled to telephone interface 240 and DSL processor 220A. Telephone interface 240 is also coupled to voice processor 220B through A/D converter 218. Telephone interface 240 includes circuitry, programming or logic to enable coupling of system 200 to telephone line 260.

Host computer 275 is coupled to DSL processor 220A and voice processor 220B through computer interface 270. Computer interface 270, in one embodiment, includes a multi-conductor connector that enables host computer 275 to communicate with DSL processor 220A and voice processor 220B of system 200.

Figure 4:
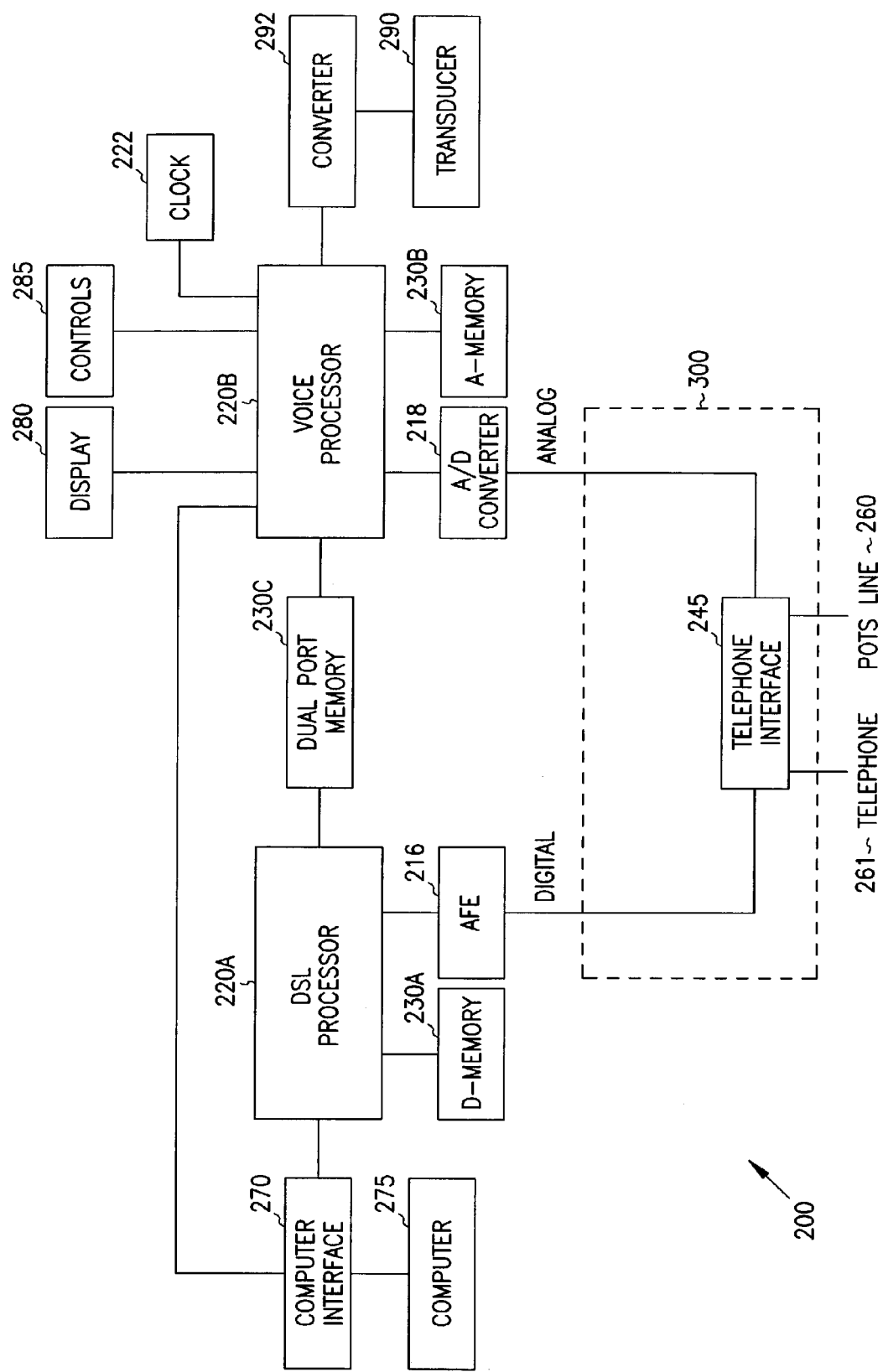
FIG. 4 is a block diagram of one embodiment of the claimed subject matter.

FIG. 4 depicts a block diagram of one embodiment of the present system. In FIG. 4, transducer 290 is coupled to voice processor 220B through converter 292. Voice processor 220B also detects DTMF signals as previously described. Converter 292 includes, in one embodiment, an audio driver for powering transducer 290. Digital signals processed by DSL processor 220A and destined for rendering by transducer 290 are routed through dual port memory 230C. Local audio detected by transducer 290 and destined for DSL processor 220A is routed through dual port memory 230C.

Clock 222 is coupled to processor 220 and provides a clock signal for system 200. In one embodiment, system 200 reads an internal clock signal from computer 275 or network 279 and updates clock 222. Clock 222 provides time and date information.

DSL processor 220A is coupled to D-memory 230A. D-memory 230A provides storage for data or programming accessible to DSL processor 220A. D-memory 230A, in one embodiment, includes random access memory, read-only memory or disk drive memory.

Voice processor 220B is coupled to A-memory 230B. A-memory 230B provides storage for data or programming accessible to voice processor 220B. A-memory 230B, in one embodiment, includes random access memory, read-only memory or disk drive memory.

In this embodiment, voice processor 220B and DSL processor 220A are coupled to dual port memory 230C. Dual port memory 230C provides storage for data or programming accessible to both voice processor 220B and DSL processor 220A. Dual port memory 230C, in one embodiment, includes random access memory, disk drive memory, or other dynamic memory.

DSL processor 220A is coupled to AFE 216. AFE 216 receives digital data from DSL processor 220A, converts the digital data into corresponding analog signals, and then transmits the analog signals to telephone interface 245. AFE 216 provides the conversion needed to enable DSL processor 220A to communicate using DSL modem functions with devices coupled to the telephone interface 245.

Voice processor 220B is coupled to A/D converter 218. A/D converter 218 includes an analog-to-digital converter and provides digital data to voice processor 220B. A/D converter 218 also includes a digital-to-analog converter and provides an analog signal to telephone interface 245. A/D converter 218 receives input signals from telephone interface 245 located within isolation barrier 300.

Both DSL processor 220A and voice processor 220B are separately coupled to computer interface 270.

Telephone interface 245 includes a connection to POTS line 260. Optionally, telephone interface 245 also includes a connection to a standard telephone 261. Telephone interface 245 includes an RJ-11 connector, in one embodiment. Isolation barrier 300 provides electrical isolation to prevent high voltages appearing in system 200 from being transmitted to the telephone line.

Figure 5:
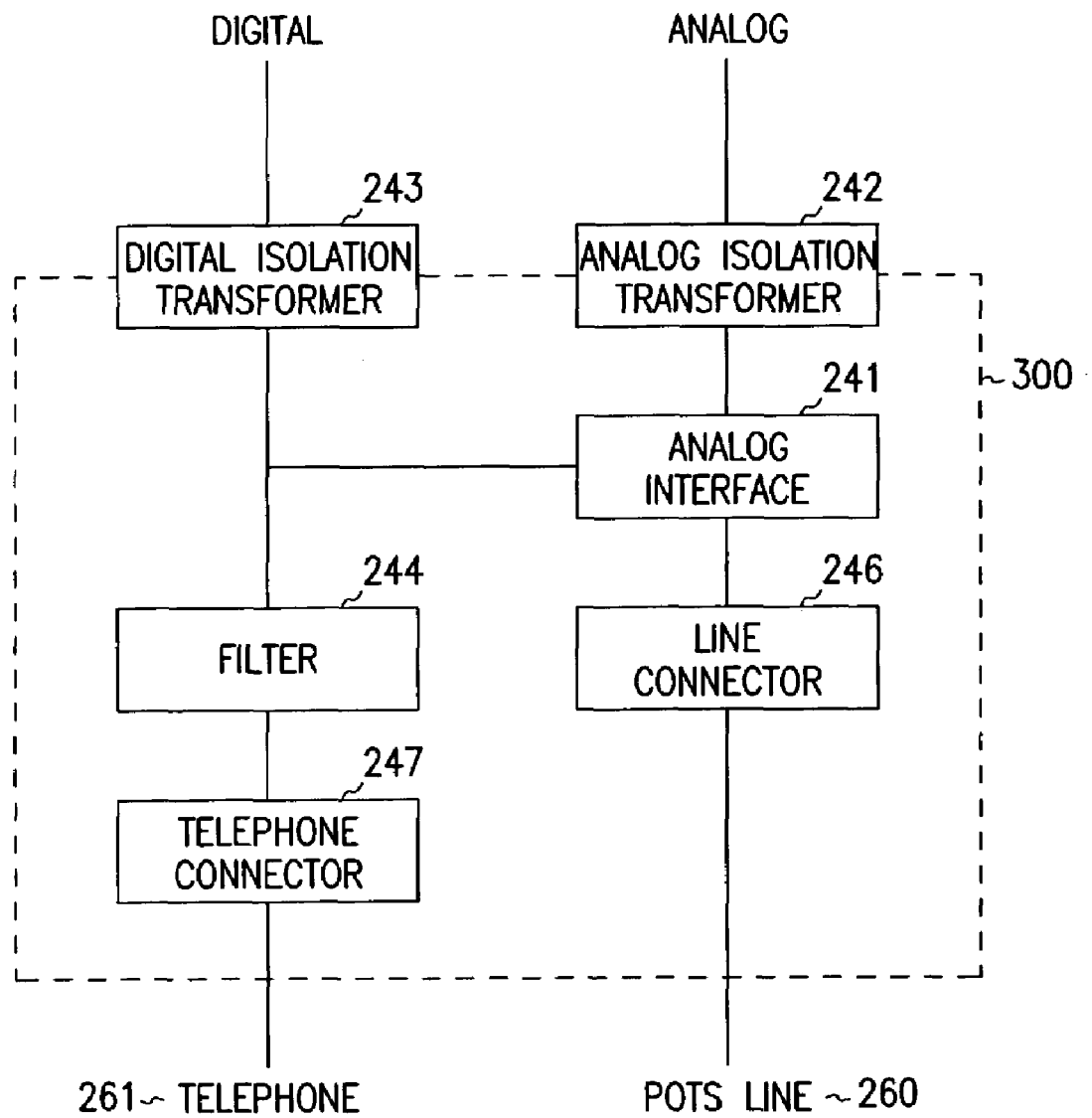
FIG. 5 is a block diagram depicting selected elements within the isolation barrier in one embodiment of the claimed subject matter.

FIG. 5 depicts a block diagram of one embodiment of the elements within isolation barrier 300 as shown in FIG. 4. Isolation barrier 300, in one embodiment, includes digital isolation transformer 243 and analog isolation transformer 242. Isolation transformers 243 and 242 enable signal transfer across the isolation barrier 300. Analog interface 241, located within barrier 300, is coupled to line connector 246. Line connector 246, in one embodiment, is an RJ-11 connector and enables connection to POTS line 260. Optional filter 244, in one embodiment, is connected to the junction of digital isolation transformer 243 and analog interface 241, as shown in FIG. 5. Filter 244 attenuates the high frequency signals found on line connector 246 and passes the analog voice signals to telephone connector 247. In one embodiment, filter 244 includes inductors, chokes, transformers, capacitors or other passive or active electronic components. Telephone connector 247, in one embodiment, includes an RJ-11 telephone connector or other such means for coupling a telephone or other telephony device 261.

Analog interface 241 provides analog telephone circuitry and programming for enabling telephone communications. Analog interface 241, in one embodiment, includes a holding circuit that signals a central office that the telephone line has been picked up and current is being drawn. Analog interface 241, in one embodiment, includes a ring detect circuit that detects the ringing signal associated with an incoming telephone call. Analog interface 241, in one embodiment, includes a phone detect circuit for detecting the status of a telephone line. For example, the phone detect circuit is adapted to detect that a telephone has been picked up manually or that another user is on the telephone line.

Figure 6A:
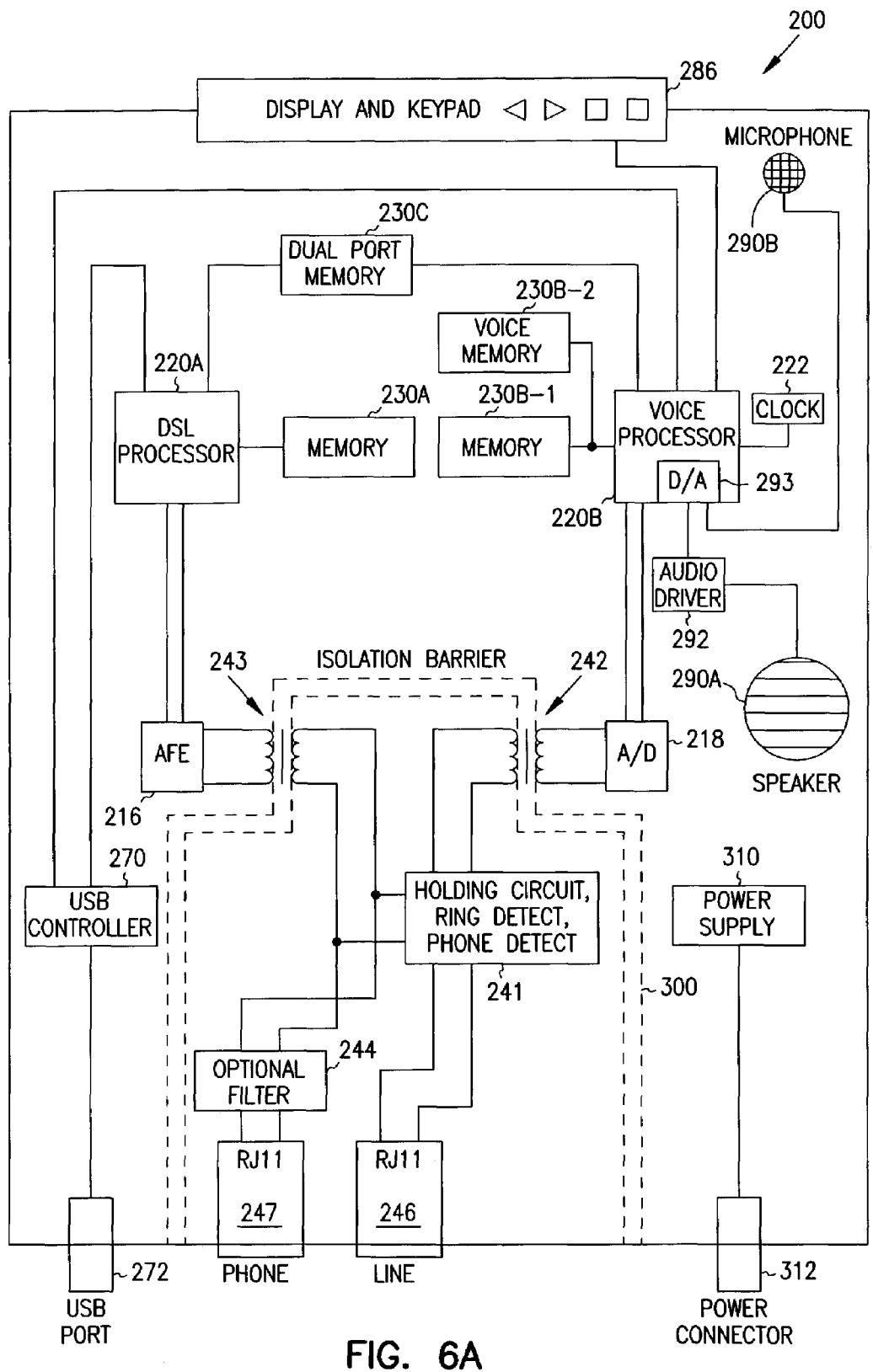
FIG. 6A is a block diagram of one embodiment of the claimed subject matter.

FIG. 6A depicts a block diagram of one embodiment of system 200. In this embodiment, computer interface 270 includes a USB controller. USB port 272, connected to computer interface 270, allows coupling of a computer to system 200. A-memory 230B-1 represents the A-memory 230B as previously discussed. A-memory 230B-2 represents voice memory and provides storage for analog audio signals. Converter 292 is shown to include an audio driver for powering the speaker 290A. D/A 293, in one embodiment, is included in voice processor 220B and translates digital data to analog signals for delivery to converter 292. D/A 293 also translates audio signals received from microphone 290B into digital data for processing by voice processor 220B. Voice processor 220B detects DTMF signals as previously described. Input/output device 286 is a combination of the previously described control 285 and display 280 incorporated in a single unit. Power supply 310 provides electrical power to system 200. Power supply 310 receives power through power connector 312. Circuit module 241, in one embodiment, includes a holding circuit, ring detect circuit and phone detect circuit. AFE 216 provides an interface between DSL processor 220A and telephone connector 246. Computer interface 270 is separately coupled to DSL processor 220A and voice processor 220B. DSL processor 220A and voice processor 220B are each coupled to dual port memory 230C.

Clock 222 is coupled to voice processor 220B and provides a clock signal for system 200. In one embodiment, system 200 reads an internal clock signal from computer 275 or network 279 and updates clock 222. Clock 222 provides time and date information.

Figure 6B:
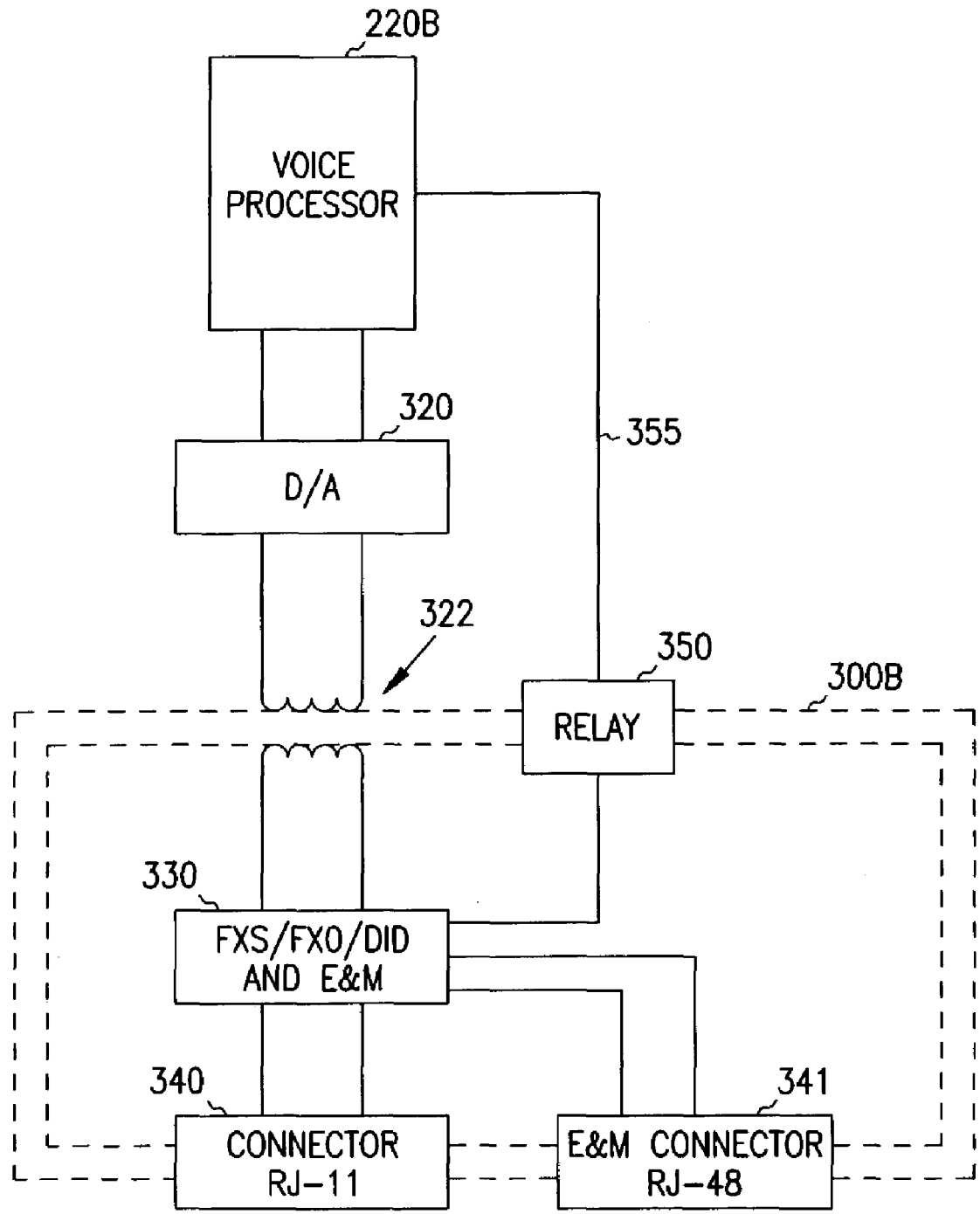
FIG. 6B is a portion of a block diagram of one embodiment of the claimed subject matter including an FXS/FXO interface.

FIG. 6B depicts a portion of a block diagram of one embodiment of the claimed subject matter including a interface 330. In the embodiment shown, interface 330 includes an FXS/FXO/DID and E&M interface. FXS/FXO refers to foreign exchange station and foreign exchange office. DID refers to direct inward dial. E&M is sometimes referred to as ear and mouth and denotes a particular type of analog signaling. Both DID and E&M involve signaling by way of changing the polarity of the connectors. In addition to those elements described with respect to FIG. 6A, this embodiment includes interface 330 coupled to voice processor 220B. In FIG. 6B, voice processor 220B is coupled to D/A converter 320. D/A converter 320 is further coupled to isolation transformer 322. Isolation transformer 322 is coupled to interface 330. FXS/FXO/DID and E&M interface 330 is coupled to connector 340 and E&M connector 341. In one embodiment, connector 340 is an RJ-11 telephone connector and connector 341 is an RJ-48 connector. Isolation barrier 300b encloses FXS/FXO/DID and E&M interface 330. Isolation barrier 300b also comprises isolation transformer 322 and connector 340. Voice processor 220B also is coupled to relay 350 by control line 355. Relay 350, in response to signals from voice processor 220B, controls the mode of operation of FXS/FXO/DID and E&M interface 330. Isolation barrier 300b includes relay 350.

In one embodiment, interface 330 is compatible with FXS/FXO signaling. In one embodiment, interface 330 is compatible with DID signaling. In one embodiment, interface 330 is compatible with E&M signaling. In one embodiment, interface 330 supports FXS/FXO/DID and E&M signaling.

FXS/FXO/DID and E&M interface 330 allows system 200 to be coupled to a telephone or a telephone network. In one embodiment, the telephone network is a Private Branch Exchange ("PBX"). When connector 340 is coupled to a telephone, FXS/FXO/DID and E&M interface 330 is operated in the FXS or powered, mode. When connector 340 is coupled to a telephone network or PBX, then FXS/FXO/DID and E&M interface 330 is operated in the FXO, or unpowered, mode. FXS/FXO/DID and E&M interface 330 allows system 200 to receive an incoming analog or digital telephone calls and route the call to equipment coupled to connector 340. For example, an incoming analog phone call can be routed, via the FXS/FXO/DID and E&M interface 330 to a PBX connected at connector 340, thus allowing the caller to communicate using the PBX.

Figure 7A:
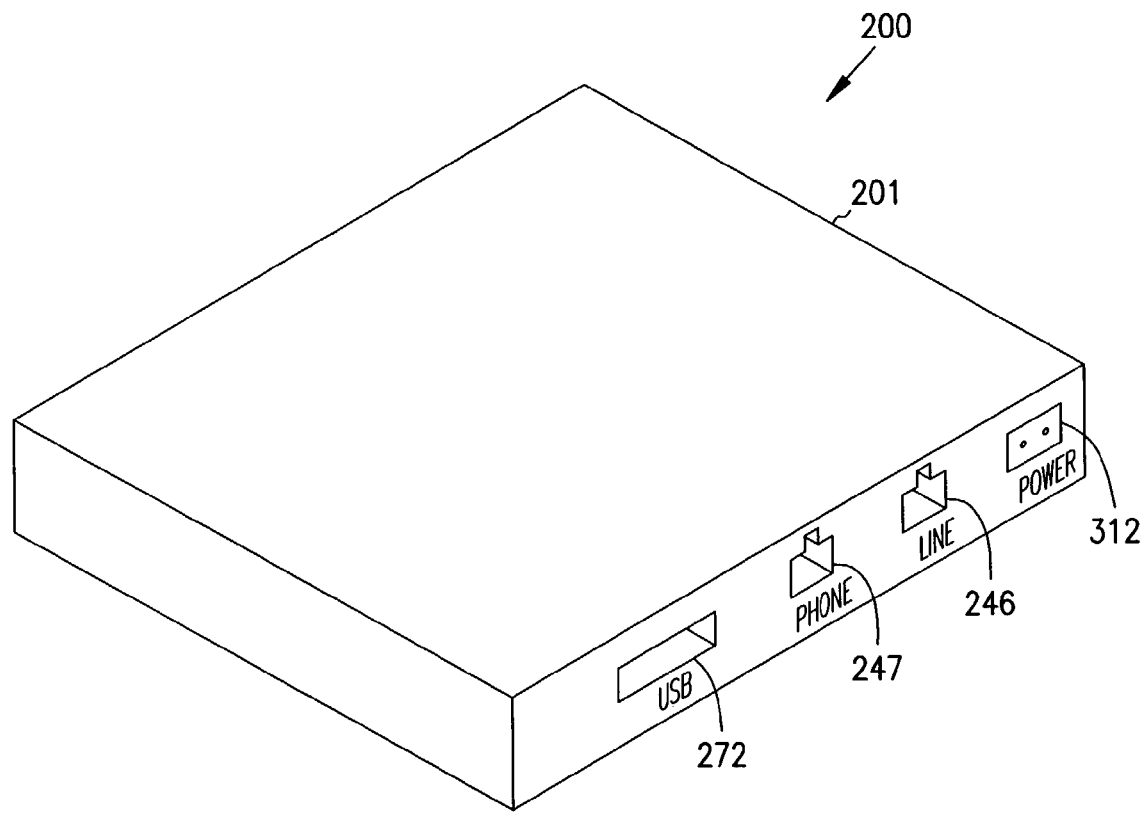
FIG. 7A is an isometric view of one embodiment of the claimed subject matter.

FIG. 7A depicts an isometric view of one embodiment of system 200. Housing 201 encloses the internal components. Power connector 312 accepts a power cord for delivery of power to system 200. Line connector 246 couples to a wall telephone connector for communication with a POTS. Telephone connector 247 couples to analog telephone equipment, including, for example, a regular telephone set, a fax machine, or a caller ID device. Connector 272 is a USB connector for coupling a host computer to system 200.

Figure 7B:
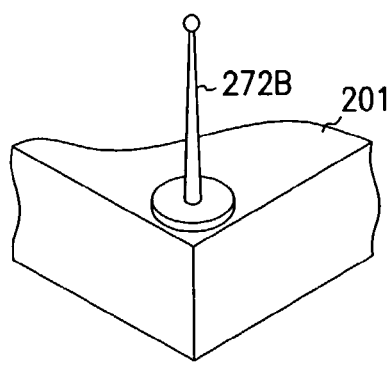
FIG. 7B is an isometric view of a portion of one embodiment of the claimed subject matter.

FIG. 7B is an isometric view of a portion of one embodiment of the claimed subject matter wherein connector 272 is replaced by antenna 272B to enable wireless coupling to a network.

Figure 7C:
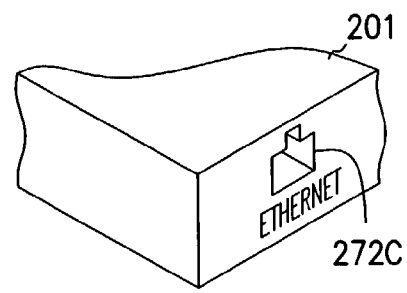
FIG. 7C is an isometric view of a portion of one embodiment of the claimed subject matter.

FIG. 7C is an isometric view of a portion of one embodiment of the claimed subject matter wherein connector 272 is replaced by Ethernet connector 272C to enable coupling to an Ethernet network.

Figure 8:
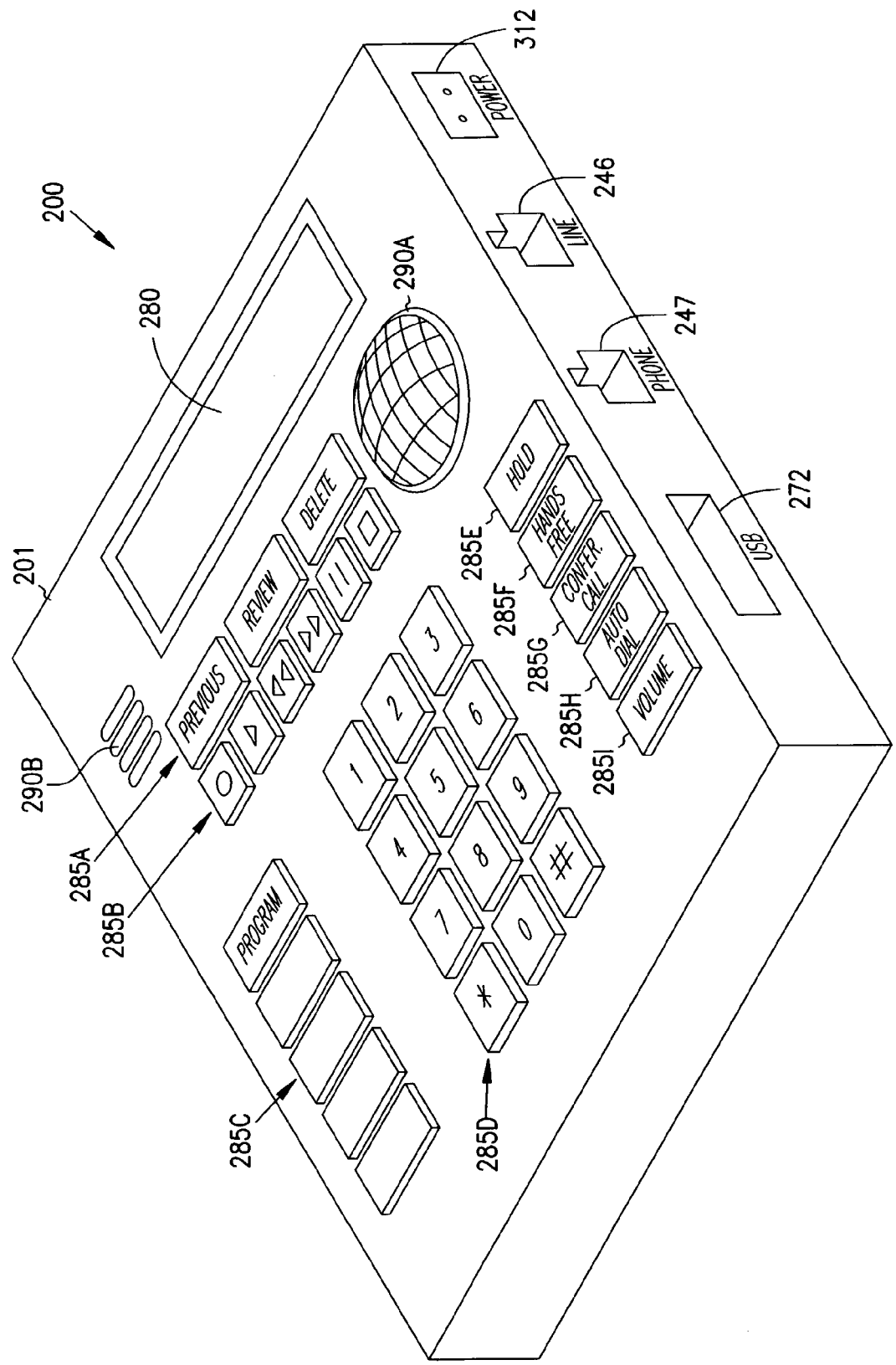
FIG. 8 is an isometric view of one embodiment of the claimed subject matter.

FIG. 8 depicts an isometric view of one embodiment of system 200. In this embodiment, housing 201 encloses the various components, controls, connectors, transducers and the display. Display 280 is an LCD display for producing alphanumeric messages and having icons for indicating status or operating mode of the various functions. Microphone 290B is an audio frequency microphone that allows recording of outgoing messages in conjunction with message saver functions and permitting speakerphone communications. Speaker 290A is an audio speaker or other transducer for producing local audio as a function of received electrical signals and allows system 200 to play, or render, saved messages and to conduct speakerphone communications.

Caller identification controls 285A are a set of electrical switches for controlling the display of information associated with the caller identification function. In one embodiment, the set of controls 285A includes buttons labeled "Preview," "Review," and "Delete." The "Preview" and "Review" buttons allows forward and reverse chronological order scrolling through the list of decoded caller identities and the "Delete" button enables deletion of a selected caller identity entry from the list of saved entries.

Message saver functions are controlled by message saver controls 285B. Controls 285B include buttons normally associated with an audio recorder, namely, buttons providing functions tantamount to fast forward, rewind, play, record, pause and stop. Such controls are known in the audio industry. Controls 285B may also include controls enabling sophisticated editing of both incoming messages as well as outgoing messages. Controls 285B also interact with display 280 to allow the user to manage the execution of the message saver functions, as described in this disclosure.

Controls 285C control various custom telephone functions. Custom telephone functions include those available from the telephone company, such as call-waiting, last number redial and others available through programming of the system and accessible to the user.

Keypad 285d is a standard telephone number keypad and includes digits 0 through 9 and, in one embodiment, a pound button and an asterisk button.

Miscellaneous controls, also disposed on housing 201, include, for example, HOLD button 285E, HANDSFREE button 285F, CONFERENCE CALL button 285G, AUTO-DIAL button 285H and VOLUME button 285I. HANDSFREE button 285F operates to activate microphone 290B and speaker 290A. The balance of the miscellaneous controls are known in the art.

In this embodiment, connectors disposed on the side panel of housing 201 include power connector 312, POTS line connector 246, telephone connector 247 and computer interface connector 272.

Figure 9:
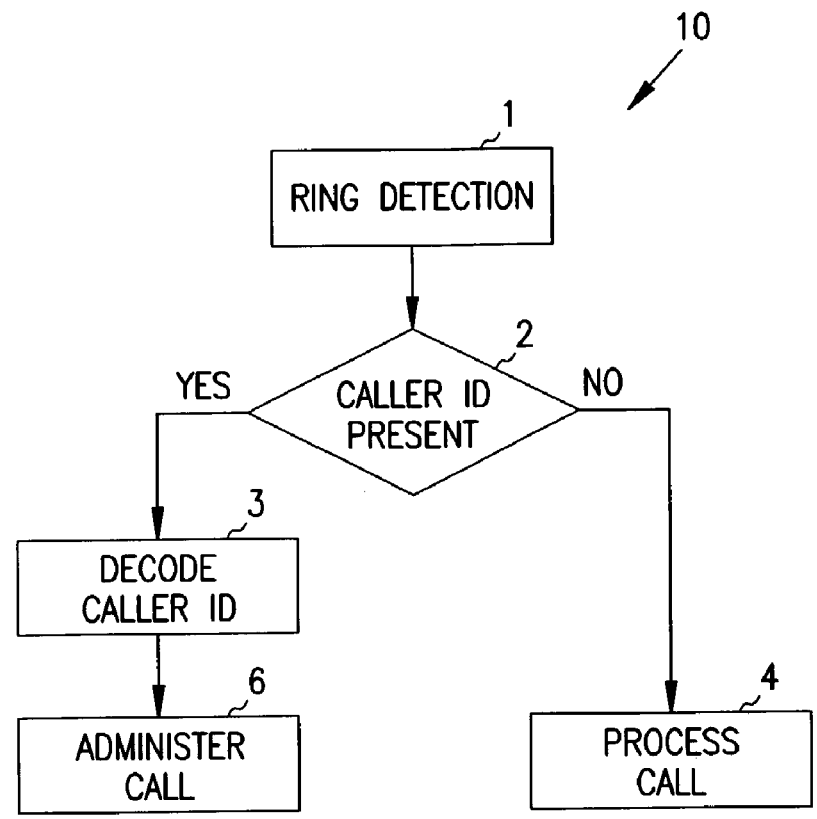
FIG. 9 is a flow chart depicting a portion of a method executed by one embodiment of the claimed subject matter.

FIG. 9 is a flow chart depicting a portion of a method executed by one embodiment of the claimed subject matter. Starting at step 1, method 10 entails detecting a ring signal on a POTS line coupled to line connector 246. At step 2, method 10 queries as to the presence of caller identification information. If no caller identification information is present, then method 10 proceeds to process call at step 4. If caller identification information is present, then method 10 proceeds to decode the caller identification information at step 3, followed by administer call at step 6.

Figure 10:
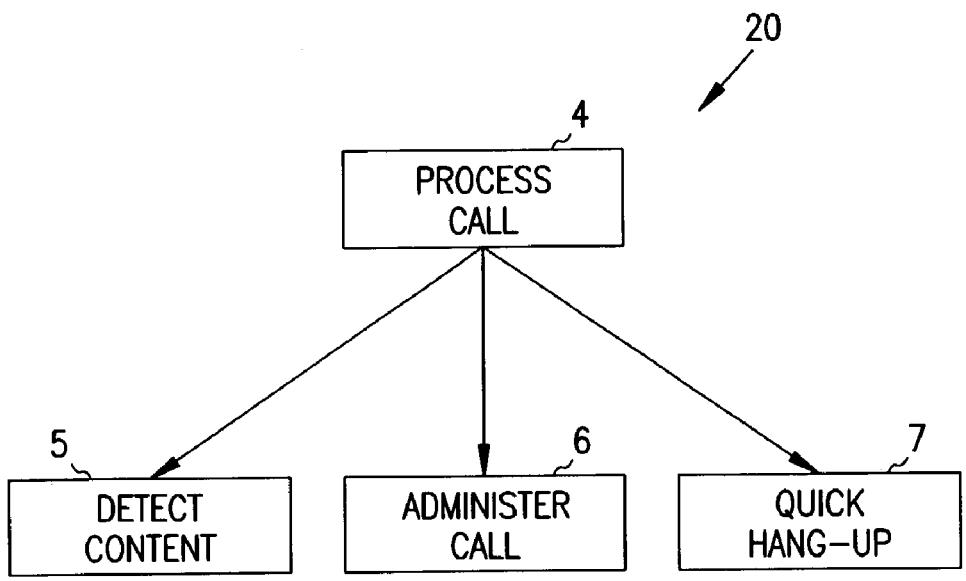
FIG. 10 is a flow chart depicting a portion of a method executed by one embodiment of the claimed subject matter.

FIG. 10 is a flow chart depicting a portion of a method executed by one embodiment of the claimed subject matter. Method 20 is a continuation of method 10 as depicted in FIG. 9 and portrays three alternatives for processing the call at step 4. Step 5 refers to detection of the content of an incoming telephone call and is further described below with respect to FIG. 11. Step 6 refers to the events subsequent to having decoded caller identification information. In step 6, the decoded information provides the basis upon which the call is administered. For example, the decoded information may indicate that the incoming call is to be routed to an external fax machine, in which case, system 200 transmits the received information via telephone connector 247. As another example, step 6 may provide that the call is to be routed to a particular computer in a network coupled to the computer interface 270. At step 7, processing the call entails performing a quick hang-up. Quick hang-up is disclosed in U.S. Pat. No. 5,546,448, and U.S. patent application Ser. No. 08/338,340, each of which was previously incorporated by reference in its entirety.

Figure 11:
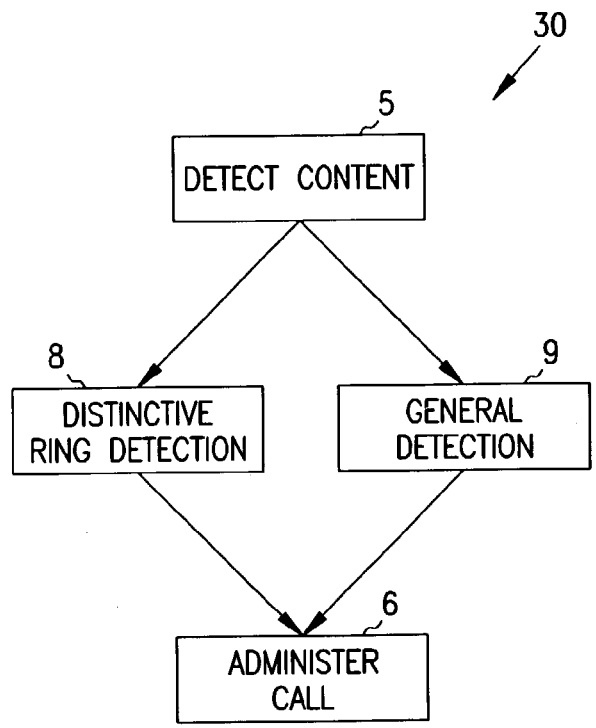
FIG. 11 is a flow chart depicting a portion of a method executed by one embodiment of the claimed subject matter.

FIG. 11 is a flow chart depicting the continuation of method 20 of FIG. 10. Method 30 portrays two alternatives for detecting the content 5 of an incoming call. The content may include analog signals representing audio signals or fax data. The content may also include digital data representing audio, fax data, digital data, voice-over-data, or digital video data. At step 5, detecting the content of the incoming call may include detecting and analyzing a distinctive ring signal 8. For example, uniquely coded ring signal patterns may denote the content of the incoming call. Alternatively, at 9, a general detection procedure may be applied to detect the call content. Examples of a general detection procedure include analysis of header information to detect the content, analysis of tones and cadences to detect a fax, or analysis of DTMF signals entered by a caller. Having detected the content at either step 8 or step 9, the method continues at step 6 in which the call is administered as previously described.

Figure 12:
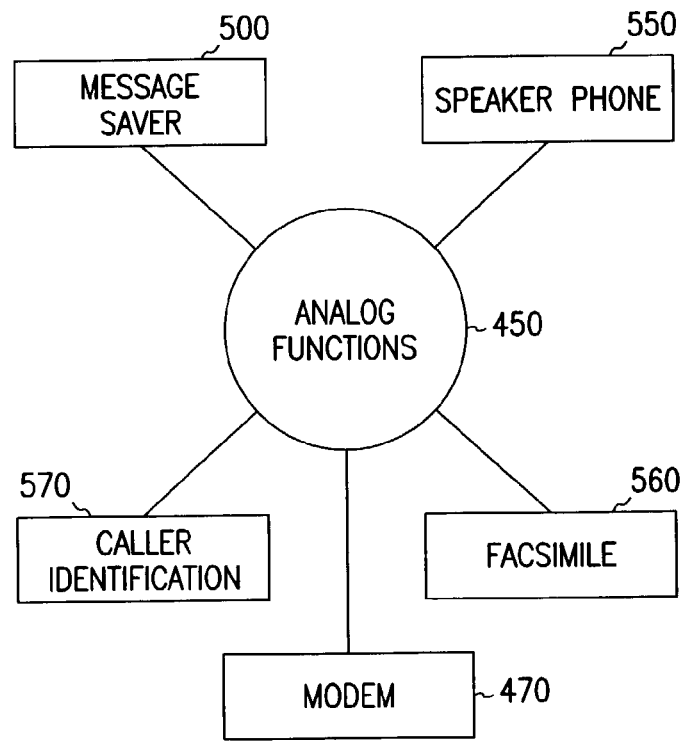
FIG. 12 depicts selected analog features available using one embodiment of the claimed subject matter.

FIG. 12 depicts selected analog functions 450 available using one embodiment of the present system. In the embodiment shown, message saver 500, speakerphone 550, caller identification 570, facsimile 560, and modem 470 are available. The five analog functions presented in FIG. 12 does not constitute an exclusive list.

The analog and digital features that are available depend upon, for example, the amount of available memory 230, presence and type of transducer 290, display 280, and controls 285, computer interface 270, as well as any peripheral equipment available. Peripheral equipment includes, but is not limited to, host computer 275 and other telephony devices connected to telephone connector 247. System 200 accommodates multiple simultaneous occurrences of the same, or different, digital functions. Encoded packet identification information enables multiple, simultaneous digital functions.

It is to be noted that a computer coupled by a network to system 200 can be operated in the same manner as a host computer coupled to system 200. With reference to FIG. 1, all functions operable using computer 275 are also available using computer 56, computer 57 or computer 58. Computer 56, computer 57, computer 58, and computer 275 can each be operated to provide message saver function, speakerphone function, facsimile function, modem function, or caller identification function.

Figure 13:
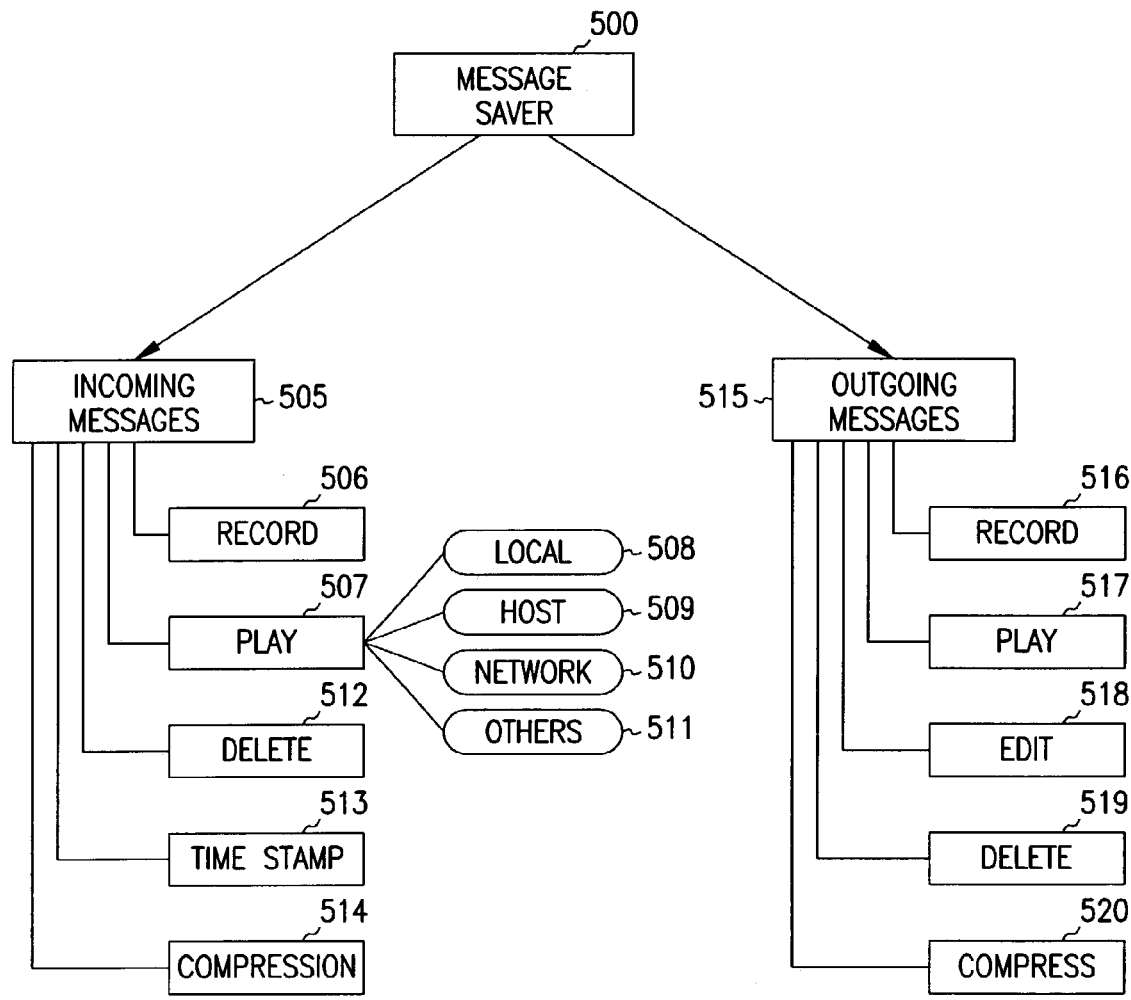
FIG. 13 depicts selected functions associated with the message saver feature.

FIG. 13 presents details of the message saver function. The content associated with an incoming telephone call is presented in FIG. 13 as an incoming message 505. The incoming message is recorded at 506 as the message is received. The incoming message can be played at 507. The incoming message can be performed using various resources. For example, local 508 denotes playing the message directly from system 200 and is available when the incoming message is available from within the memory of system 200 and using the audio transducer built in system 200. Host 509 denotes playing the message using the host computer coupled to system 200. The incoming message may be stored in the memory internal to the host computer or in the memory internal to system 200. Network 510 denotes playing the message using a computer within the network coupled to system 200. Other 511 denotes playing the message from a remote location or via other means. Delete 512 is available to selectively delete incoming messages previously saved. Time stamp 513 denotes generating and storing with the incoming message, a record of the time or date of receipt of the message. Upon playing the message, at 507, the time stamp record is available for rendering. Compressing 514 denotes any compression scheme to reduce the amount of memory required for storage of the incoming message.

Outgoing messages, such as caller greetings, are denoted at 515. Record 516 denotes the function to allow a user to record the outgoing message or messages. Record 516 also entails providing a schedule for rendering of outgoing messages. Play 517 provides that outgoing messages can be performed audibly for the benefit of a local user. Edit 518 includes powerful editing features that enable the user to mix different audio signals or edit the recorded outgoing message as desired. Delete 519 enables the user to erase outgoing messages. Compress 520 denotes any audio compression scheme to reduce the amount of memory required for storage of the outgoing audio message.

Figure 14:
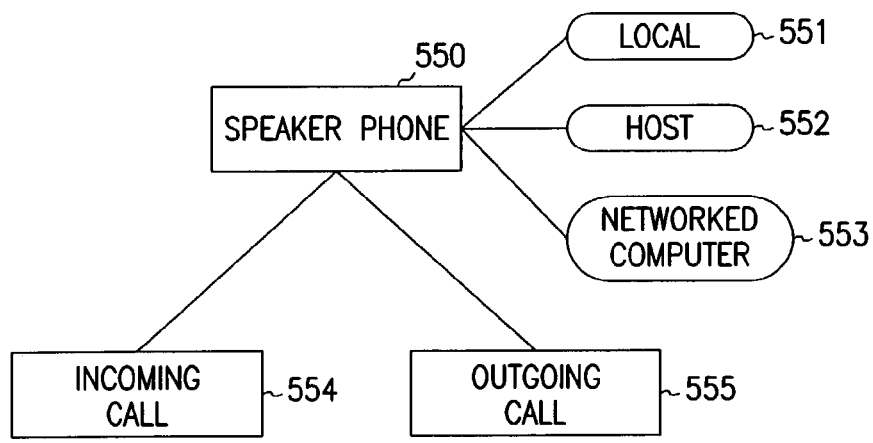
FIG. 14 depicts selected functions associated with the speakerphone feature.

FIG. 14 denotes the speakerphone function. The speakerphone function is available for use with incoming calls 554 as well as outgoing calls 555. Dialing of outgoing calls can be accomplished by the numeric keypad of the system 200 or a keyboard coupled to a computer connected to system 200. Speakerphone 550 can operate using the local hardware of system 200, as shown at local 551. Speakerphone 550 can also operate using the audio transducers of the host computer, as noted at host 552, or using a networked computer, as noted at 553.

Figure 15:
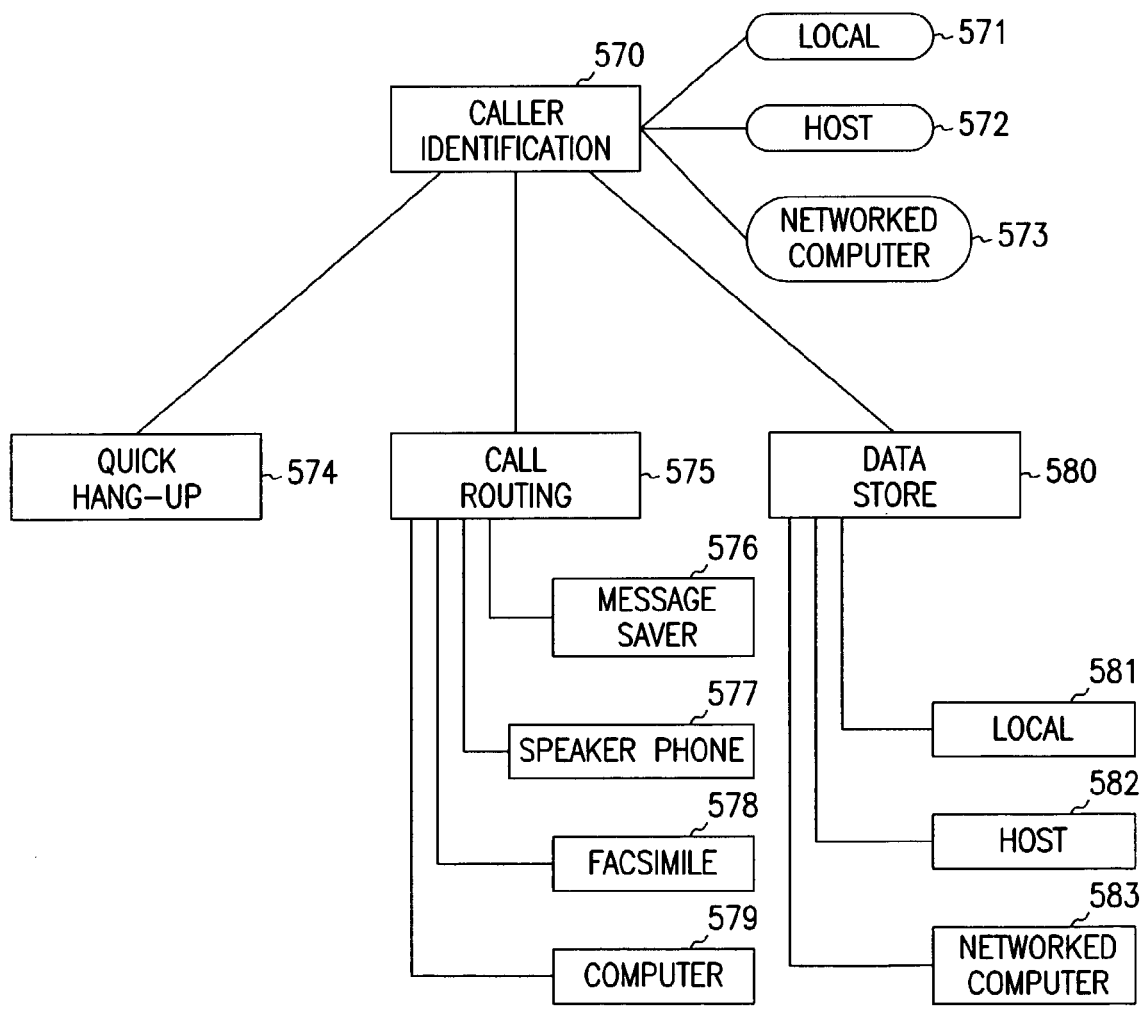
FIG. 15 depicts selected functions associated with the caller identification feature.

FIG. 15 denotes the caller identification function 570. The caller identification information can be displayed or stored in various locations. The caller identification information can be displayed on local hardware (local 571), the host computer (host 572) or a networked computer 573. Also, the caller identification information can be stored, 580, on memory associated with the local hardware (local 581), the host computer (host 582) or a networked computer 583. As noted elsewhere in the specification, the caller identification information can be the basis upon which a quick hang-up is performed, as denoted at quick hang-up 574. Call routing 575 is accomplished as a function of caller identification information. The incoming call can be routed to the message saver 576, speakerphone 577, facsimile 578 or computer 579.

Figure 16A:
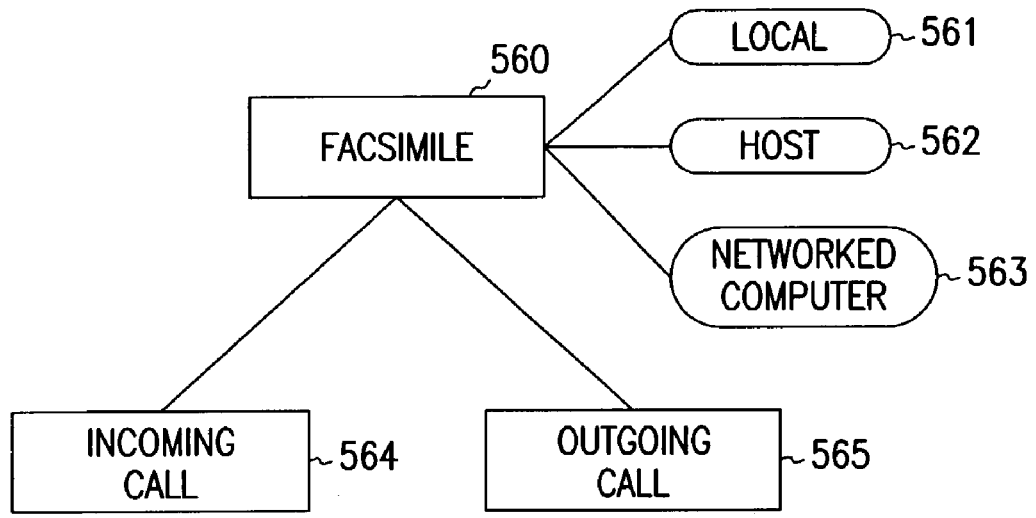
FIG. 16A depicts selected functions associated with the facsimile feature.

FIG. 16A denotes the facsimile function 560. Incoming faxes 564 can be received by system 200 and outgoing faxes 565 can be transmitted using system 200. The data for outgoing faxes can be received by system 200 in various ways, including via the computer interface or the telephone interface. The receipt of an incoming fax can be displayed in various locations, including, local hardware 561, host computer 562, or a networked computer 563. The incoming fax data can also be stored in various locations, including, the local hardware 561, the host computer 562, or a networked computer 563.

Figure 16B:
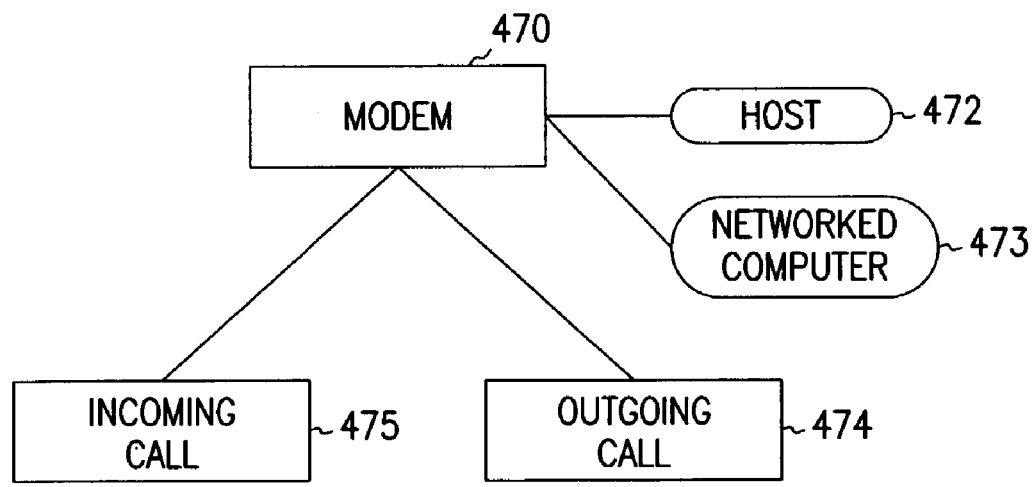
FIG. 16B depicts selected functions associated with the modem feature.

FIG. 16B denotes the modem function 470. Incoming modem communication sessions 475 can be detected and received by system 200. In addition, outgoing modem communication sessions 474 can be originated and transmitted using system 200. Modem communication sessions can be conducted using the host computer, as denoted at 472, or using a networked computer, as denoted at 473. The modem communication session may conform to any of a variety of communication standards, including V.34 or V.90.

In one embodiment, during the course of a modem communication session, such as a DSL communication session, system 200 is able to receive, originate and process analog telephone calls. In one embodiment, detected caller identification information on an incoming call is decoded by processor 220. Depending upon the configuration of system 200, the decoded caller identification information is displayed on display 280, stored in memory 230 or forwarded to host computer 275 via computer interface 270. The decoded caller identification information may be transferred immediately upon decoding of the identification information or at a later time. The time for forwarding can be determined, for example, by a programmed function, or upon receipt of a request from a source external to system 200. In one embodiment, the caller identification information appears on a pop-up window appearing on the monitor 277 of host computer 275, or, in the case of a network coupled to system 200, the information appears on a predetermined group of monitors within the network. In one embodiment, the caller identification information is stored in a memory accessible to host computer 275. Furthermore, and depending upon the configuration of the system 200, either host computer 275 or processor 220 can access stored data and execute the routing and handling of the incoming telephone call.

In one embodiment, system 200 can perform analog or digital fax communication functions, including receiving and transmitting fax data, simultaneous with the execution of a modem communication session. In one embodiment, an incoming fax is detected on telephone line 260, received, digitized (if not already digitized) and stored in memory 230. In one embodiment, the data may be stored in memory accessible to host computer 275. In one embodiment, system 200 can originate a fax transmission where the fax content includes digital data stored in memory 230 or at host computer 275. Upon establishing a fax communication session with the recipient, processor 220 transmits the digitized fax data via telephone line 260. Other fax functions are also contemplated by the present subject matter, including, for example, selecting a pre-programmed fax cover page for transmission with the fax data, group faxing capabilities, polling or other such functions.

In one embodiment, fax transmissions can proceed, simultaneously and independently of, a concurrent DSL modem communication session. The difference in frequency between the fax data and the DSL modem communication enables the fax and the DSL modem communication session to proceed simultaneously.

In one embodiment, system 200 can perform speakerphone communication functions simultaneous with the execution of a modem communication session. For example, system 200 can both originate and receive an analog voice telephone call using the speakerphone function. In one embodiment, after system 200 detects the incoming analog voice telephone call, the user can issue a command to host computer 275 to execute the speakerphone function. One embodiment provides that the speaker and microphone associated with host computer 275 serves as the audio transducers for conducting the speakerphone session. In one embodiment, transducers 290 are included in system 200. In one embodiment of the present subject matter, speakerphone calls can be originated by system 200. Programming executing on host computer 275 allows predetermined telephone numbers to be dialed by system 200. System 200, upon establishing a telephone connection to the predetermined telephone number, conducts a speakerphone communication session as described above. The predetermined telephone numbers may be received by system 200 by manual entry using controls 285 or as a data file received via computer interface 270 or telephone interface 245, as shown in FIG. 4.

While many of the above descriptions include a modem communication session in process, it will be noted that this is not a prerequisite for the operation of the other described analog functions.

When a host computer or network is unavailable, one embodiment of system 200 still provides selected analog or digital functions. For example, decoded caller identification is stored in memory 230, and in one embodiment, is depicted on integral display 280. As another example, one embodiment provides that incoming messages and received fax transmissions are stored internally using memory 230. As yet another example, in one embodiment having integral transducer 290, system 200 can provide handsfree speakerphone operation.

When a host computer or network becomes available, one embodiment of system 200 provides that additional functions become available. For example, stored contents of memory 230 can be transferred to host computer 275 or networked computer for further processing, transferring, playing or printing. The stored contents in memory 230 may include, but is not limited to, for example, received audio messages, received fax transmissions, and decoded caller identification information. In one embodiment, an incoming call is routed to a predetermined computer or user in the network as a function of information detected in the call.

In one embodiment where DSL processor 220A is separate and distinct from voice processor 220B, digital data is transferred between the separate processors. Various digital data transfer protocols can be incorporated into the present subject matter. For example, in one embodiment, the digital data can be in the form of packetized data and may include either header information, footer information or both. The header information, or the footer information, can include addressing information or information keyed to the identity of the sender or recipient of the information. In one embodiment, the digital data can be transferred in data frames.

In one embodiment, data compression and decompression is utilized. For example, the content of an incoming analog voice telephone call can be compressed upon storing and later, decompressed when played. Compression may include technology as disclosed in U.S. Pat. No. 5,452,289, previously incorporated by reference in its entirety.

Messages or data stored in memory 230 can be transferred from system 200 via computer interface 270 or via telephone line connection 247. If transferred via interface 270, the data becomes available for further manipulation, editing or managing. The data of memory 230 can be transferred to computer 275 at a predetermined time, or upon a receipt of a signal from computer 275 or system 200. To transfer a message via telephone line connection 247, in one embodiment, system 200 is adapted to initiate a telephone call and then forward the message at the appropriate time, or alternatively, system 200 is adapted to receive a telephone call and then forward the message. Initiating, or establishing, a call entails seizing the telephone line, dialing a predetermined telephone number corresponding to the remote location, coordinating the communication with the receiving location, transferring the message, and terminating the call.

In one embodiment, system 200 can respond to an incoming call requesting the transfer of a stored message. One embodiment provides that system 200 detects an incoming telephone call, answers the call, executes a security check to verify the authorization of the caller to access a stored message, and upon successful verification, transfers the requested message after which, system 200 releases the telephone line.

In one embodiment, caller identification information can serve as the mechanism by which incoming calls are routed to a predetermined recipient. The recipient may be within a local network coupled to system 200 or the recipient may be at a remote location. A pre-determined list comprising caller identification information corresponding to targeted recipients is stored in memory and enables caller routing.

In addition to call routing on the basis of caller identification, routing can also be performed on the basis of time or day of receiving the call. Clock 222 in the foregoing figures provides the clock information to enable call routing on the basis of time or day of receiving the call. For example, one embodiment of system 200 provides that calls received during a predetermined period are routed to a predetermined telephone number at a remote site. In one embodiment of system 200, other measurable parameters can serve to determine the routing and management of the incoming telephone call.

In one embodiment, call routing can be performed on the basis of user-entered DTMF signals. In one embodiment, call routing can be performed on the basis of data encoded in the header of packets or on the basis of fax tones and cadences.

In one embodiment, system 200 can either accept or reject incoming calls based on any means of content detection. For example, calls can be accepted or rejected based on decoded caller identification information. Accepting the call can include answering the call and invoking the message saver function as described above, or routing the call to the appropriate recipient as described above. Rejecting the call, in one embodiment, can include answering the call and immediately hanging-up the telephone line. It is believed that such a quick-hang-up will tend to frustrate human callers and discourage repeated unwanted calls. Rejecting undesirable, or unauthorized, incoming telephone calls serves to reduce unnecessary burden on the communication resources (including, for example, the telephone line and the present subject matter) and assures that the communication resources are available for desired callers.

Figure 17:
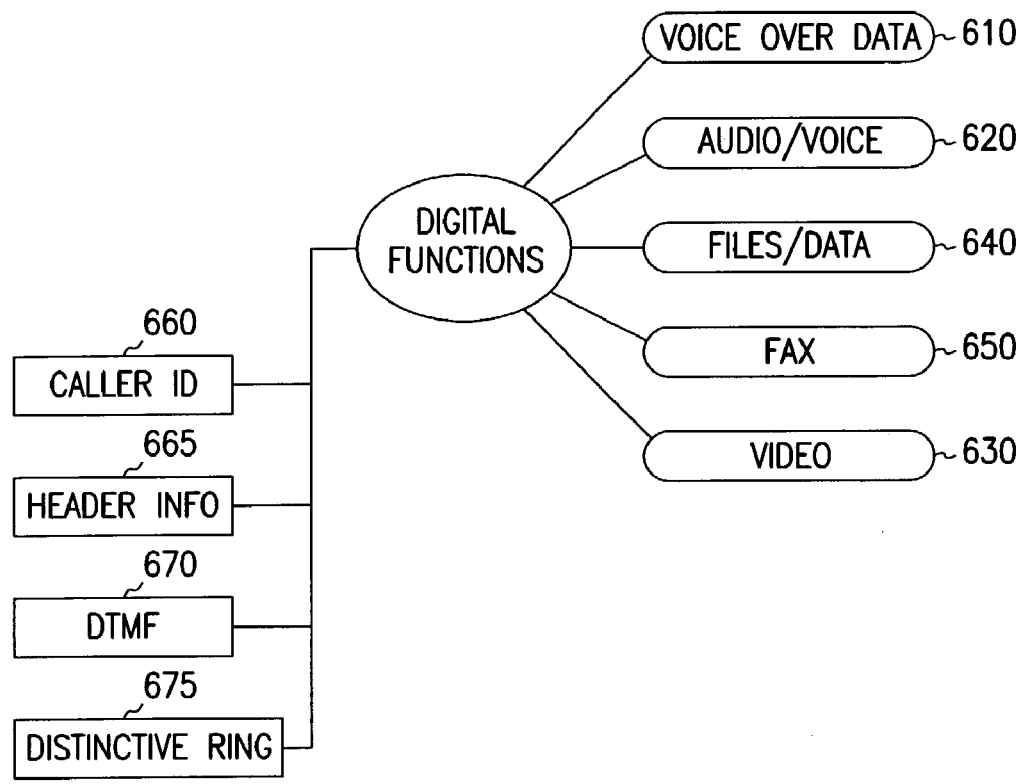
FIG. 17 depicts selected digital functions available using one embodiment of the claimed subject matter.

In one embodiment, system 200 is suitable for conducting various digital communication functions as depicted in FIG. 17. Digital communications functions can include receiving and forwarding various types of digital communications, including digital voice over data 610, digital audio and voice data 620, digital files or data 640, digital fax communications 650, or digital video data 630. The content of digital communications can be detected by means of caller identification information 660, identification information encoded in the header of an incoming digital packet 665, user-generated DTMF signals 670, or distinctive ringing 675. Incoming calls bearing each of the various types of digital communications may further be screened or routed. In one embodiment of the present subject matter, caller identification information encoded with incoming digital data enables management and routing information to administer the incoming digital data. Screening or routing may be based on time or day of receiving the call, or other predetermined parameters, individually or in combination. One example of such a parameter, operable as a means of screening or routing, is the destination information embedded in the header of received packets. The content of incoming calls bearing each of the various types of digital communications may also be stored in memory coupled to DSL processor 220A.

Figure 18:
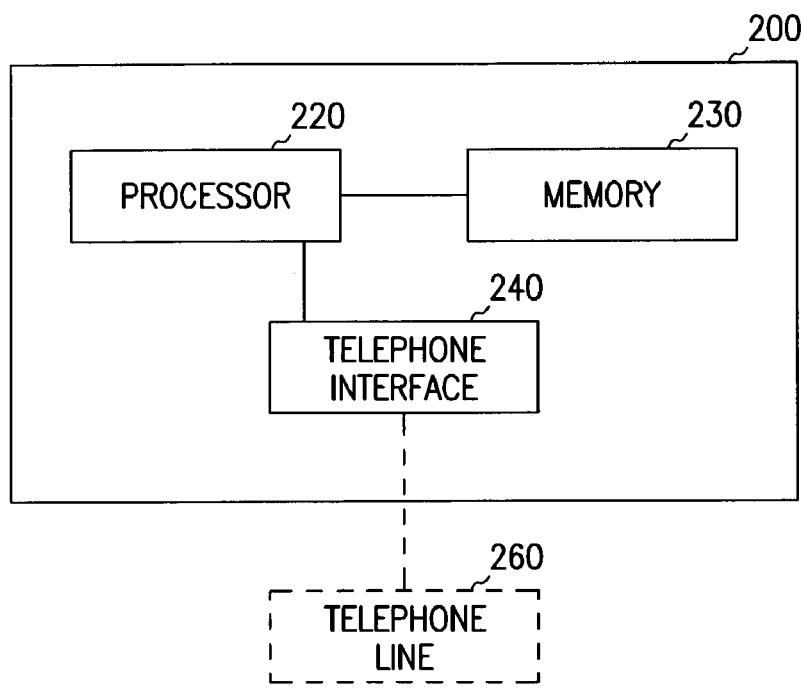
FIG. 18 depicts a block diagram of one embodiment of the claimed subject matter.

FIG. 18 depicts a block diagram of one embodiment of system 200. In this embodiment, system 200 includes processor 220 coupled to telephone interface 240 and memory 230. Telephone interface 240 transfers telephone line signals between processor 220 and telephone line 260. In this embodiment, telephone line 260 is a DSL communication line. Memory 230 provides storage accessible to processor 220 and storage for incoming messages received via the telephone interface 240.

In FIG. 18, communication with system 200 proceeds by way of telephone interface 240. Communication with system 200 includes such functions as entering programming, establishing system configuration, and input and output of data. Information received from incoming calls is initially stored in memory 230. Stored data is then later rendered, or made accessible, by transferring to another telecommunication device via telephone interface 240.

Figure 19A:
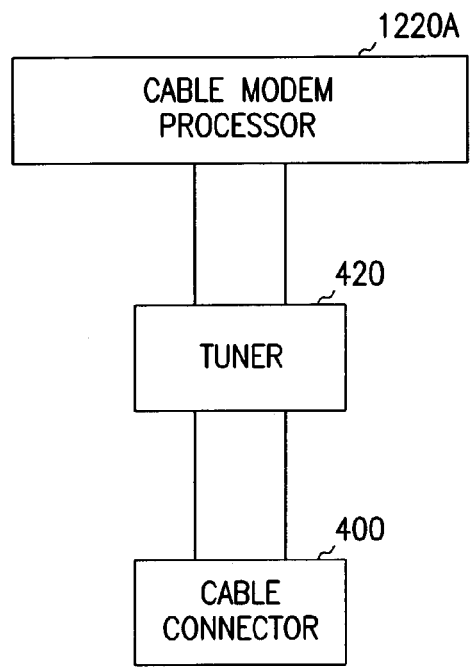
FIG. 19A depicts a portion of a block diagram of one embodiment of the claimed subject matter including a cable modem processor.

FIG. 19A depicts a portion of a block diagram of one embodiment including a cable modem processor. Cable modems provide shared access, broadband communication over a cable network. In the embodiment shown, DSL processor 220A, as shown in FIG. 6A, is replaced by cable modem processor 1220A. Referring to both FIG. 6A and FIG. 19A, cable modem processor 1220A is coupled to computer interface 270, D-memory 230A, and dual port memory 230C. Cable modem processor 1220A is further coupled to cable connector 400 through tuner 420. Cable connector 400, in one embodiment, includes a coaxial connector.

In one embodiment, system 200 can provide cable modem communications of digital data using cable modem processor 1220A while simultaneously providing analog telephone functions. Incoming digital data received via cable connection 400 is processed and stored in digital format. The stored data is accessible to voice processor 220B, and thus, is available for further processing as previously described. For example, in one embodiment, voice processor 220B provides user-notification of received messages using computer 275 or network 279.

Figure 19B:
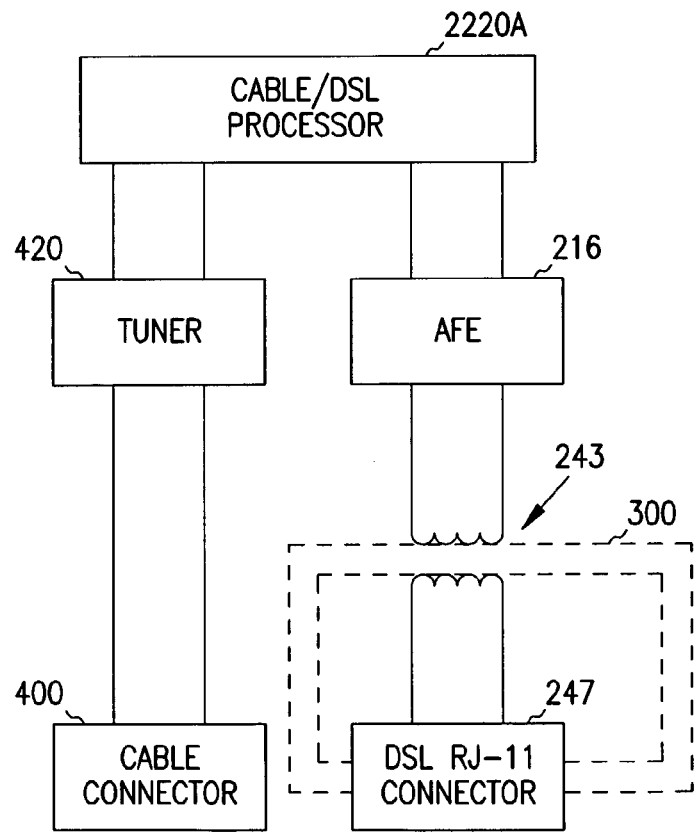
FIG. 19B depicts a portion of a block diagram of one embodiment of the claimed subject matter including a cable and DSL processor.

FIG. 19B depicts a portion of a block diagram of one embodiment including a cable/DSL processor. In the embodiment shown, DSL processor 220A, as shown in FIG. 6A, is replaced by cable/DSL processor 2220A. Referring to FIG. 6A and FIG. 19B, cable/DSL processor 2220A is coupled to computer interface 270, D-memory 230A, and dual port memory 230C. Cable/DSL processor 2220A is further coupled to cable connector 400 through tuner 420. Cable connector 400, in one embodiment, includes a coaxial connector. Cable/DSL processor 2220A is further coupled to connector 247 through AFE 216 and isolation transformer 243, as previously described.

In the embodiment shown, system 200 can provide cable modem communications as well as DSL modem communications, using cable/DSL processor 2220A while simultaneously providing analog telephone functions. Cable/DSL processor 2220A supports cable modem communications via cable connector 400 or DSL modem communications via connector 247. Digital data is stored in memory accessible to cable/DSL processor 2220A. Digital data stored in dual port memory 230C is accessible to both cable/DSL processor 2220A and voice processor 220B.

Figure 20:
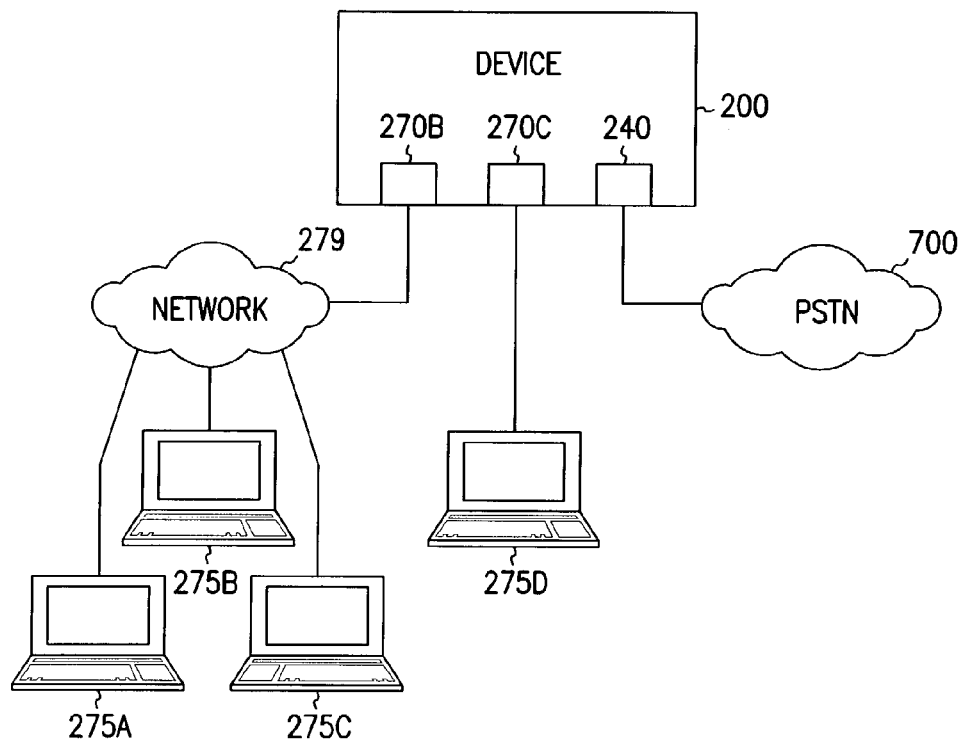
FIG. 20 depicts a block diagram of an embodiment of the present subject matter.

FIG. 20 illustrates one embodiment of the present subject matter. In the figure, device 200 is shown coupled to network 279, terminal 275D and PSTN 700. Device 200 includes a DSL router or DSL modem or other DSL device. Network 279 is coupled to device 200 at interface 270B. Interface 270B, in one embodiment, includes a network connector, such as an Ethernet network connector. Interface 270B may include an RJ-45 connector for coupling to a Category 5 (also known as Cat-5) cable. Network 279 is a digital network and is coupled to one or more computers. In the figure, network 279 is coupled to 275A, 275B and 275C. Terminal 275D is coupled to device 200 by interface 270C. Interface 270C may be a serial communication connector, or port, and may include a DB-9 or DB-25 connector. Terminal 275D may be a dumb terminal or a terminal emulator. PSTN 700 is coupled to device 200 by interface 240. Interface 240 may include a telephone line interface. In one embodiment, interface 240 includes an RJ-11 connector.

Device 200 may be configured using a telnet session and a computer connected to network 279, such as computer 275A, 275B or 275C. Telnet instructions may be transmitted to device 200. Device 200 may also be configured by terminal 275D. The present system also allows device 200 to be configured, either remotely or locally, using an analog modem communication link and PSTN 700. Device 200, as discussed above, provides digital and analog processing functions to permit independent and simultaneous DSL and analog communication. Device 200 may be configured using a web based interface and a network connection. Examples of web based interfaces include web browser programs such as Internet Explorer™ (Microsoft Corporation, Redmond, Wash.) or Netscape Navigator™ (Netscape Communications Corporation, Mountain View, Calif.).

Configuring device 200 may include, among other things, enabling or disabling dynamic host configuration protocol (DHCP), selecting communication protocols and selecting addresses. For example, device 200 may be configured to implement a particular type of DSL modulation, such as ADSL or RADSL. As another example, device 200 may be configured to enable point-to-point protocol (PPP) or asynchronous transfer mode (ATM) protocol. In some cases, the configuration of device 200 is determined by the equipment and services offered by a DSL service provider. For example, the equipment available at the central office, or head end, may impose limitations on the communication protocols available to a user of device 200. As another example, device 200 may be configured to allow network address translation (NAT).

Device 200 may be configured by any number of different means. In one embodiment, device 200 may be configured by using a terminal emulator, a network connection, a web based interface or by an analog modem coupled to device 200.

Figure 21:
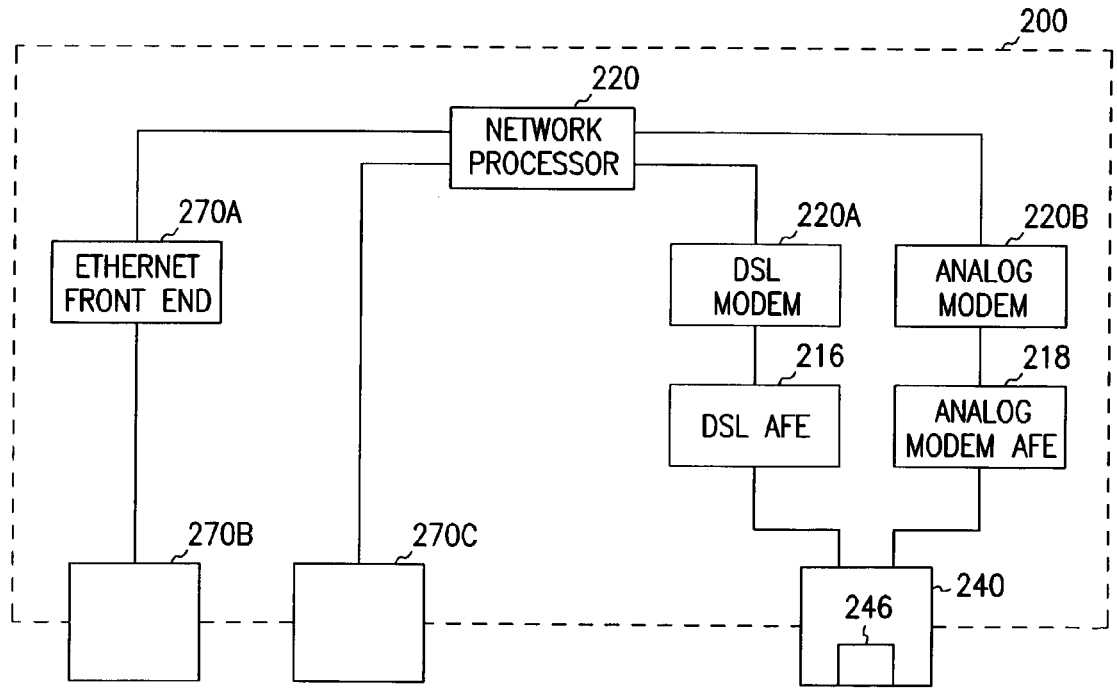
FIG. 21 depicts a block diagram of selected elements of the present system.

FIG. 21 illustrates a block diagram of selected elements of the present system. Device 200 includes processor 220 coupled to DSL modem 220A and analog modem 220B. In one embodiment, DSL modem 220A includes a processor. In one embodiment, analog modem 220B includes a processor. DSL modem 220A is coupled to a DSL front end 216 which is further coupled to interface 240. Analog modem 220B is coupled to analog modem front end 218 which is also coupled to interface 240. Interface 240 may include connector 246, which, in one embodiment, includes an RJ-11 connector to allow coupling to a telephone line.

Interface 240 may be coupled to PSTN 700. An analog modem communication link may thus be established between device 200 and a remote modem or computer.

In one embodiment, processor 220 may be coupled to network connector 270B and network front end 270A. For example, network connector 270B may include an RJ-45 connector for coupling to a Cat-5 cable and network front end 270A may include an Ethernet front end.

In one embodiment, processor 220 may be coupled to interface 270C for connecting to a serial port of a computer, terminal or terminal emulator.

In one embodiment, device 200 executes a server application. The server application may operate on network processor 220. The application program may be stored in memory accessible to processor 220. In one embodiment, the server manages network traffic and allows a user with a browser or a web based interface program to communicate with, and thus, control and monitor functions, of device 200.

Consider next the operation of device 200. A remote user can access device 200 using PSTN 700 and analog modem 220B. In one embodiment, analog modem 220B, in communication with processor 220, can receive configuration data, as well as firmware to control the operation of DSL modem 220A. In one embodiment, analog modem 220B, in communication with processor 220, can transmit configuration data relative to DSL modem 220A. In one embodiment, the remote user can access device 200 and retrieve data concerning operational parameters, available head end services, and protocols currently enabled. The remote user can also transmit instructions, data, firmware, parameters or other digital data to device 200.

A remote user can also execute diagnostic functions using, for example, analog modem 220B. For instance, the remote user can run a program to evaluate the network connection or generate information regarding the configuration of device 200. A loopback address test can be performed on the DSL modem or the analog modem. In addition, a remote user can "ping" various nodes external to device 200 or execute a network utility function to evaluate device 200 and the communication system. "Ping" refers to packet Internet groper and is a troubleshooting utility used to determine whether a specific Internet protocol (IP) address is accessible. Pinging works by sending a packet to the specified address and waiting for a reply.

The remote user may operate a command line interface, a web based program, a graphical user interface program, or other program to communicate with device 200. In one embodiment, the remote user can access device 200 without intervention from a local human operator, and thus, the remote user can configure device 200 to operate in a manner compatible with the head end equipment of the DSL service provider.

In addition, analog modem 220B allows for accessing data at the local site via processor 220. Analog modem 220B, like DSL modem 220A, provides a communication channel to a second processor coupled to processor 220. The second processor may be co-located with device 200 or it may be remotely located. For example, in the event that DSL services are interrupted or otherwise unavailable, data can be exchanged using analog modem 220B. Consequently, either DSL modem 220A or analog modem 220B can be used to communicate with device 200. Programming, or the set of instructions, accessible to, and executing on, processor 220 enables communication between the remote user coupled to interface 240 via PSTN 700 and device 200.

Dial back-up service remains available using the present system. Dial back-up service refers to a secondary connection that allows a user to access an external network, such as the Internet. For example, in the event of DSL service failure, dial back-up allows users to continue to access critical business applications at high speeds until the DSL line is restored.

Processor 220 communicates with analog modem 220B for purposes of control and setup of analog modem 220B and for purposes of sending and receiving setup and configuration information to a remote user with a remote computer. Processor 220 communicates with DSL modem 220A for purposes of setup and configuration of DSL modem 220A, checking DSL modem status information and for sending and receiving network user data. In one embodiment, processor 220 connects and communicates to network 279 via network port 270B through Ethernet front end 270A. Processor 220 communicates with terminal 275D via serial communication port 270C.

CONCLUSION

Although the present subject matter has been described with reference to the foregoing specific embodiments, many alternatives, variations and modifications will be apparent to those of ordinary skill in the art. Those alternatives, variations and modifications are intended to fall within the scope of the following appended claims.

What is claimed is:

1. A system comprising:
a processor;
a network connection coupled to the processor;
a digital subscriber line (DSL) modem coupled to the processor;
an analog modem coupled to the processor;
a telephone line interface coupled to the DSL modem and the analog modem and adapted for coupling to a telephone line coupled to a public switched telephone network (PSTN); and a remote computer coupled to the PSTN and adapted for communicating with the analog modem.

2. The system of claim 1 wherein the remote computer is adapted for receiving data from the DSL modem.

3. The system of claim 1 wherein the processor is coupled to a serial communication port.

4. The system of claim 1 wherein the processor is coupled to a network computer.

5. The system of claim 1 wherein the processor is coupled to a terminal.

* * * * *